(12) United States Patent
Schiffmiller

(10) Patent No.: US 10,802,109 B1
(45) Date of Patent: Oct. 13, 2020

(54) TECHNIQUES FOR BUILDING PULSE TRAINS OF EMISSION SOURCES

(71) Applicant: BAE Systems Information and Electronic Systems Integration Inc., Nashua, NH (US)

(72) Inventor: Richard Schiffmiller, Teaneck, NJ (US)

(73) Assignee: BAE Systems Information and Electronic Systems Integration Inc, Nashua, NH (US)

( * ) Notice: Subject to any disclaimer, the term of this patent is extended or adjusted under 35 U.S.C. 154(b) by 93 days.

(21) Appl. No.: 16/355,930

(22) Filed: Mar. 18, 2019

(51) Int. Cl.
*G01S 7/02* (2006.01)
*G01S 7/00* (2006.01)

(52) U.S. Cl.
CPC .................................. *G01S 7/021* (2013.01)

(58) Field of Classification Search
CPC ... G01S 7/021; G01S 3/52; G01S 5/02; G01S 5/04; G01S 7/023; G01S 7/34; G01S 13/34; H04W 28/0226; G06F 17/10
See application file for complete search history.

(56) References Cited

U.S. PATENT DOCUMENTS

| | | | | |
|---|---|---|---|---|
| 4,918,455 A | * | 4/1990 | Maier | G01S 7/021 342/13 |
| 5,610,609 A | * | 3/1997 | Rose | G01S 7/021 342/107 |
| 5,689,274 A | * | 11/1997 | Rose | G01S 5/02 342/146 |
| 5,774,087 A | * | 6/1998 | Rose | G01S 3/52 342/113 |

(Continued)

FOREIGN PATENT DOCUMENTS

EP 1988403 A2 * 11/2008 ............. G01S 7/021

OTHER PUBLICATIONS

Kim et al. "Radar scan pattern analysis for reduction of false identification in electronic warfare support systems." In: IET Radar, Sonar & Navigation 8.7. Dec. 6, 2013 (Dec. 6, 2013) Retrieved on May 15, 2020 (May 15, 2020) from <http:/lcspl .ee .pusan .ac.kr/sites/cspl/download/internation_j/IET_radar_2014_KYH .pdf> entire document.

(Continued)

*Primary Examiner* — Bernarr E Gregory
(74) *Attorney, Agent, or Firm* — Finch & Maloney PLLC

(57) ABSTRACT

A method of processing times-of-arrival (TOAs), some representing emitted pulses by an emitter and generated from a pulse pattern having a fixed greatest common divisor pulse repetition interval (GPRI), the method including: creating pulse trains each including an initial TOA and a vector of added TOAs, and a corresponding pulse index vector mapping the TOA vector into the pulse pattern consistent with a known TOA tolerance and viable with a known GPRI range of the emitter type; and walking, for each pulse train, each next TOA after the added TOAs, and each next index mapping the next TOA into the pulse pattern, including checking if the pulse train extended by the next TOA and next index is consistent with the TOA tolerance, checking if the extended pulse train is viable with the GPRI range, and if both checks pass, adding the next TOA and next index to the pulse train.

20 Claims, 6 Drawing Sheets

(56) References Cited

U.S. PATENT DOCUMENTS

| | | | | |
|---|---|---|---|---|
| 6,100,845 | A * | 8/2000 | Rose | G01S 3/52 |
| | | | | 342/417 |
| 6,714,155 | B1 * | 3/2004 | Rose | G01S 7/021 |
| | | | | 342/107 |
| 6,933,888 | B1 * | 8/2005 | Schiffmiller | G01S 7/021 |
| | | | | 342/387 |
| 6,985,102 | B1 * | 1/2006 | Horn et al. | G01S 7/021 |
| | | | | 342/13 |
| 7,830,297 | B1 * | 11/2010 | Wang | G01S 7/021 |
| | | | | 342/13 |
| 2006/0284755 | A1 * | 12/2006 | Sirois | G01S 7/021 |
| | | | | 342/13 |
| 2007/0073797 | A1 * | 3/2007 | Johnson | G06F 17/10 |
| | | | | 708/446 |
| 2007/0075900 | A1 * | 4/2007 | Johnson | G01S 7/021 |
| | | | | 342/387 |
| 2013/0157599 | A1 * | 6/2013 | Ray | G01S 7/021 |
| | | | | 455/130 |
| 2015/0358852 | A1 * | 12/2015 | Richley | H04W 28/0226 |
| | | | | 370/328 |

OTHER PUBLICATIONS

Pra Thy Usha et al. "Radar Scan Pattern synthesis and implementation on FPGA." In: International Journal of Scientific & Engineering Research. Jun. 2015 (Jun. 2015) Retrieved on May 15, 2020 (May 15, 2020) from <https:/lwww.jser.org/researchpaper/RADAR-Scan-Pattern-synthesis-and-implementation-on-F PGA.pdf> entire document.

International Search Report, PCT/US20/22926, dated Jun. 15, 2020, 11 pages.

\* cited by examiner

TECHNIQUES FOR BUILDING PULSE TRAINS OF EMISSION SOURCES

BACKGROUND

Devices such as radar and communication devices can emit electromagnetic radiation in pulses. Groups of pulses from the same emitter are called pulse trains. To function as intended, pulse trains have particular patterns or characteristics. Accordingly, electronic warfare (EW) techniques can detect these patterns or characteristics as a way of uncovering information about the corresponding emitters. However, there are a number of nontrivial issues associated with pulse trains.

Figure 1:
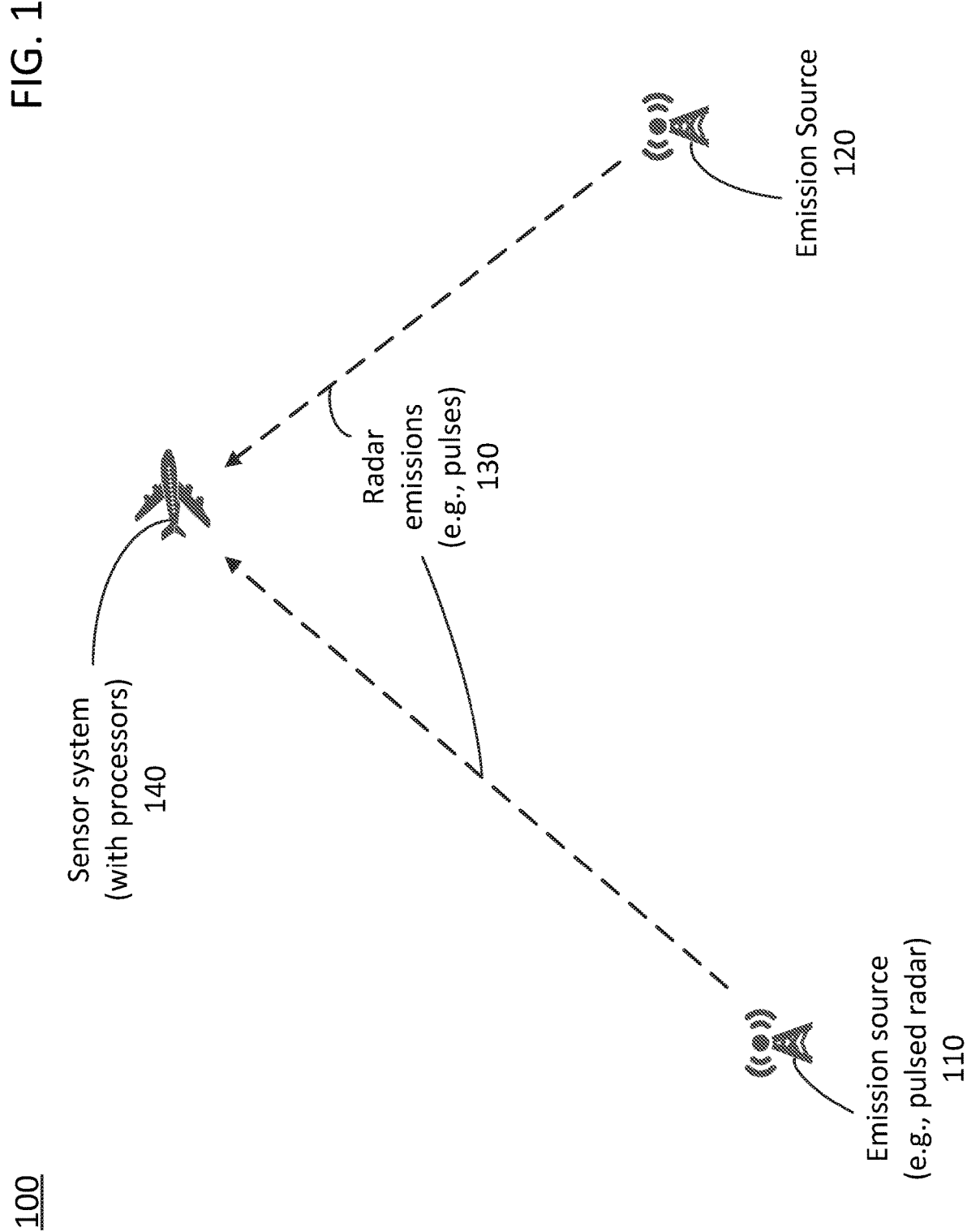
FIG. 1 is a schematic diagram of an example use case of a sensor system for building pulse trains of emission sources, according to an embodiment of the present disclosure.

Although the following Detailed Description will proceed with reference being made to illustrative embodiments, many alternatives, modifications, and variations thereof will be apparent in light of the present disclosure.

DETAILED DESCRIPTION

According to one or more embodiments of the present disclosure, a method of building a pulse train of a particular emission source (such as a radar or communications device) is provided. The pulse train is built from a subset of a set of time-of-arrival (TOA) records. Each TOA record (or TOA for short) represents a sensing of a pulse of electromagnetic radiation that is obtained by an electromagnetic radiation sensor. Each pulse is emitted from one of possibly several emission sources (also referred to as emitters), including the particular emission source of interest. The method can be carried out, for example, on a computer processor-based system having one or more processors and one or more storage devices. The method includes receiving the time-ordered TOA records at one of the processors. The TOAs are differentiated primarily by time, namely their corresponding time-of-arrival at the sensor that detects them. Some of the sensed pulses represent emitted pulses by the particular emitter and are generated in the emitter from a pulse pattern. The pulse pattern has a fixed greatest common divisor pulse repetition interval (GPRI) that identifies a type of the particular emitter. As such, the pulse-to-pulse intervals (PPIs) of the emitted pulses are multiples of this GPRI. In some embodiments, the TOAs stay within a known measurement tolerance (or TOA measurement error tolerance or TOA measurement tolerance or TOA tolerance) of their corresponding true arrival times. While the GPRI may be unknown for any particular emitter type, in some embodiments, the GPRI falls within a known range.

The sensed pulses (or TOAs) of the particular emitter may have gaps compared to the emitted pulses, such as when the sensor is unable to pick up all the emitted pulses. Further, there may be other sensings (such as from stray pulses that may enter through antenna sidelobes or due to noise, or other emission sources) that cause corresponding additional TOAs to be introduced. As such, in some embodiments, building a proper pulse train includes accounting for gaps or missing pulses in the TOAs, and disregarding extraneous TOAs that are not part of the emitted pulses from the particular emission source. To this end, in some embodiments, the method further includes building (at one or more of the processors) candidate pulse trains for the particular emitter from the TOAs using a corresponding known range of the GPRI for the emitter source. In some embodiments, this building includes creating initial pulse trains each including an initial TOA along with a vector of one or more following TOAs from among the TOAs. In addition, each pulse train includes a corresponding pulse index vector (PIV) of increasing pulse indices mapping the TOA vector into the pulse pattern in a manner consistent with the GPRI and the TOA measurement tolerance and viable with the GPRI range of the emitter type.

In addition, building the pulse trains further includes walking through the remaining TOAs in time order for each pulse train and each next TOA in the TOA vector. In some embodiments, the walking includes computing a next pulse index mapping the next TOA into the pulse pattern, and checking if the pulse train extended by the next TOA and next index is still coherent with the pulse train and its GPRI tolerance. In addition, the walking includes checking if the extended pulse train is still viable with the known GPRI range of the emitter type, and if both checks pass, adding the next TOA and next index to the pulse train. In some such embodiments, a given pulse train is coherent with respect to the GPRI when the known GPRI and TOA tolerances and the PIV define a corresponding GPRI tolerance that shrinks with the increasing pulse indices of the PIV. In addition, the initial TOA, the TOA vector, and the PIV define a corresponding estimated GPRI (EGPRI, or EPRI for short) as the midpoint of the GPRI tolerance interval that converges to the true GPRI with the increasing PIV pulse indices. Further, all values within the GPRI tolerance define an interval whose intersection with the GPRI tolerance intervals of the pulse train with fewer pulses and PIV pulse indices yields a GPRI interval that includes the EPRI for a coherent pulse train. In an embodiment, the given pulse train is viable (or consistent) with the known GPRI range of the emitter type when the GPRI interval overlaps (at least in part) with the known range of the GPRI.

Put another way, the initial TOA, the TOA vector, and the PIV of the pulse train define a corresponding greatest common divisor PRI (GPRI) tolerance region, the midpoint of which is an estimated GPRI (EPRI) that divides evenly into every PPI of the assembled pulse train, and converges to the GPRI of the emitter. In some embodiments, the TOAs in a pulse train may be evaluated as time duration baselines from a common reference pulse (such as the initial TOA), and not as PPIs. Further, the tolerance region for the GPRI of the pulse train under construction may be compared with that derived from a candidate additional TOA's baseline for the pulse train. Here, the coherent overlap of tolerance regions also includes determining a tolerance region for the GPRI of the additional TOA's baseline and comparing it with the GPRI tolerance region of the existing pulse train under construction. A coherent match occurs if the midpoint of the additional TOA's GPRI tolerance region falls within the GPRI tolerance region of the existing pulse train. In one such embodiment, the extended pulse train's GPRI tolerance range is consistent (or viable) in a non-coherent sense with the input known GPRI range when the two GPRI ranges overlap (at least in part). Both coherent and non-coherent overlap tests must be passed to add a candidate TOA (and corresponding pulse index) to the pulse train under construction. Further, the GPRI tolerance region and the midpoints of those regions (the expected GPRIs, or EPRIs) of the pulse train formed from the pulse baselines define a corresponding GPRI interval of nested or overlapping GPRI intervals about their corresponding EPRIs.

According to some embodiments, the method further includes selecting (at one of the processors) one such candidate pulse train as the pulse train of the particular emission source. The selection can vary between embodiments, and can include one or more indicators of a good pulse train, such as: selecting a pulse train having at least a given number of TOAs or a given proportion of the TOAs; selecting a pulse train having a largest number of TOAs; selecting a pulse train whose EPRI is closest to the midpoint of the known range, selecting a pulse train whose EPRI multiplied by the PIV has a smallest root mean square error (RMSE) with respect to the TOA vector; and selecting a pulse train whose GPRI interval contains a minimum RMSE point that when multiplied by the PIV has a smallest RMSE with respect to the TOA vector of any point in the GPRI interval and of the minimum RMSE point of any other pulse train. Numerous other criteria can be used to select the candidate pulse train, as will be apparent in light of this disclosure. Once selected, in some embodiments, the pulse train is used to identify the particular emission source, such as by determining an accurate estimate of the GPRI of the emitter type. In other embodiments, the pulse train is used to deinterleave the TOAs, by removing those TOAs belonging to the pulse train, so the pulse train building process can be carried out a second time with the remaining TOAs, possibly with a different emission source (having a different GPRI range, or even the same GPRI range). Numerous variations and embodiments will be appreciated in light of this disclosure.

General Overview

As mentioned above, there are a number of nontrivial issues associated with pulse trains. For example, these trains are usually emitted with a variable or random PPI whose pattern is known to the emitter, but not to the sensor trying to detect or identify the emitter. Accordingly, there may not be an apparent pattern to the PPI's pulse trains. Moreover, there can be multiple emission sources (emitters) emitting pulse trains concurrently (such as in an interleaved fashion). This can clutter sensings of these pulse trains, making it difficult to distinguish one pulse train from another. Further, this situation can be exacerbated by multiple concurrent pulse trains emitted by different emission devices of the same type. These pulse trains appear to most sensing techniques to be the same emitting device, with no way to distinguish or identify the individual emitters. In addition, there can be stray (e.g., noise, multipath, reflections or other sources of pulses that are delayed but otherwise nearly identical, to name a few) pulses within the pulse sensings, which further complicate the process of identifying the real trains from other signals. Furthermore, some pulses can be missing from the pulse train sensings, as not every pulse is capable of being sensed by every sensor. As such, trying to distinguish fragmentary pulse train sensings from more complete pulse trains presents its own set of challenges.

Thus, in accordance with one or more embodiments of the present disclosure, techniques are provided for identifying and deinterleaving multiple pulse trains from emission stream sensings. These techniques work in cluttered environments, such as with multiple emitters, even of the same type, and in the presence of noise or stray pulses. Further, these techniques work even with missing pulses from the sensed emissions. In some embodiments, accurate GPRI discriminants are extracted from emission sensings without any hardware modifications to help resolve ambiguities in emitter identification. In addition, deinterleaving of overlapping trains, or trains containing stray (such as noise, multipath, or both noise and multipath) pulses, or with missing pulses (dropouts) in the trains of interest, may be accomplished with this fixed GPRI that is discussed throughout. Moreover, specific emitter identification (e.g., fingerprinting) to distinguish two emitters of the same type may be performed with this GPRI.

According to one or more embodiments, techniques disclosed herein extract this GPRI found on, for example, pulsed radar and radio emissions, to a high level of precision. Accordingly, this GPRI can be used as an additional discriminant to resolve the identity of an emitter that is ambiguous based on conventional electronic warfare (EW) parameters. The GPRI is also used to deinterleave pulse trains (e.g., untangle or separate overlapping pulse trains from one another and/or other pulses) using only accurately measured times-of-arrival (TOAs). In one or more embodiments, techniques are provided to exploit the time span of the data to increase the precision of the extracted GPRI so that the GPRI can be used for specific emitter identification (SEI). These techniques are relatively insensitive to sporadic missing pulses in the trains of interest and require no hardware modifications for their implementation.

In one or more embodiments, coherent time-based techniques are provided to compute the GPRI as well as a pulse index vector to map a sequence of pulse time-of-arrival (TOA) measurements from an emitter to a pulse pattern generated by the emitter and having the fixed GPRI (that identifies the emitter type). While this GPRI may not be known with great precision for a particular emitter type, measurement observations derived from earlier sensings can be used to provide a range for the GPRI for the particular type of emitter. Further, there is a known measurement tolerance within which the sensed pulses (TOAs) correspond to the constant GPRI of the emitter. In some such embodiments, the techniques also derive an associated vector of numbers that represent increasing pulse indices into the pulse pattern of the particular emitter. For instance, the pulse sensings (TOAs) can be time-ordered, and the associated pulse index vector (PIV) is a series of integers or pulse positions relating the TOAs to the pulse pattern used by the emitter to generate the emitted pulses from the emitter. As such, each difference of one in pulse indices represents a corresponding time difference of the fixed GPRI between the corresponding emitted pulses, while larger differences in the pulse indices represent corresponding larger multiples of the GPRI in time differences between the emitted pulses. However, because of measurement error (bounded by the known measurement error tolerance, or TOA tolerance), the measured time differences between TOAs are not necessarily precise multiples of the GPRI.

According to one or more embodiments, techniques disclosed herein operate on pulsed emission devices such as pulsed radars or any system with a common GPRI-based parameter. Such techniques may also be used for other pulsed systems whose underlying GPRI timing is sufficiently stable. In some such embodiments, these techniques can be used for emitter type identification (e.g., type of emitter), ambiguity resolution (e.g., separating stray or noise pulses from legitimate pulses of a single pulse train), and the like. In other such embodiments, these techniques can be used for deinterleaving (e.g., removing a pulse train belonging to one emitter from a set of pulse sensings, such as to make it easier to process the remaining pulse sensings) and signal sorting (e.g., determining which pulses belong to which emitter). In still other such embodiments, these techniques can be used for specific emitter identification (SEI, e.g., to distinguish the pulsed emissions from two emitters of the same type, or to identify a set of pulse sensings with a precise emitter whose GPRI was discovered earlier). In some embodiments, a non-coherent technique is used to compute an inverse GPRI (IGPRI, or IPRI for short) and an associated PIV from pulse repetition frequency (PRF) data (e.g., to perform SEI of pulse Doppler radars). In some embodiments, these techniques place no aperture requirements on the host system (e.g., TOA pulse sensings alone are sufficient input sensings to perform the techniques).

In one or more embodiments, these techniques estimate the underlying GPRI or its inverse (IPRI) of a pulsed radar from raw PRI or PRF data. In some such embodiments, coherent versions of these techniques operate in the time domain by estimating the constant PRI through a greatest common divisor (GCD) and an intersection of tolerances approach. Here, candidate pulse trains are built from TOA records and evaluated based on being emitted from a candidate emitter type whose constant PRI is a greatest common divisor into all baseline intervals or PPIs of the candidate pulse train. A baseline interval is the time duration from a reference pulse of the pulse train (e.g., an initial pulse) to some other pulse in the pulse train. The GPRI is computed within a tolerance region and not precisely because of the known error tolerance in measurement. The GPRI tolerance region is successively intersected with that computed for each baseline. The successive intersections of tolerances reduces the size of the tolerance region, so that the GPRI is known with greater accuracy. As each new candidate TOA is added to a pulse train, the tight GPRI region further limits the possible PRIs that can coherently (e.g., consistently) account for the TOAs in the train. The shrinking tolerance range of the GPRI as the span of the pulse train increases limits which TOAs will match the GPRI. Eventually, one pulse train (such as the longest pulse train) wins out as the most likely candidate pulse train given the set of TOAs. In some other embodiments, non-coherent techniques operate in the frequency domain (PRF). Here, some such techniques estimate the fundamental frequency through an intersection of intervals approach.

In some embodiments, processing begins with identifying all the likely pulse trains from the frequency range to which the receiver is tuned. In addition to the TOA data, the techniques also have a set of GPRI ranges for likely emission source types whose TOAs are being analyzed. There is also a known measurement tolerance of the TOA data. In some embodiments, the processing of the different emitter types is the same, only using different GPRI ranges, so it suffices to describe the technique from the perspective of a given emission source type (or emitter type) having a given known range of GPRI values, together with a constant maximum tolerance on the error of the measurements of the TOA data from the true values.

In some embodiments, candidate pulse trains are built using the TOA data in a systematic fashion (e.g., multiple nested loops) in time order, assigning next TOAs to the candidate pulse train and corresponding pulse indices to the PIV to maintain coherence within the pulse train and consistency (or viability) with the given range of GPRI values. Likely pulse trains (e.g., that fit the TOA data well in the sense that some value in the constant GPRI region is a greatest common divisor for all TOA baselines in the train) are kept, while unlikely pulse trains (e.g., that do not fit the TOA data well, such as exhibiting unusually large gaps, or inconsistent GPRI ranges or intervals) are dropped. In some embodiments, after rejecting all likely pulse trains starting with the first TOA, the process is repeated for all likely pulse trains starting with the second TOA, and so on. At the end, the most likely candidate pulse train or trains from each of the possible emitter types are considered, and the candidate pulse train having the best fit is selected and identified with its corresponding emission source type.

In some embodiments, after building the pulse train for the emission source, the set of TOAs is deinterleaved (e.g., the TOAs of the pulse train are depopulated from the set of TOAs), and the pulse train process repeated on the remaining TOAs. In some embodiments, after building the pulse train, the GPRI is estimated to the highest precision consistent with the TOA data (e.g., using a least squares fit), and this estimated GPRI (EPRI) is used to identify the corresponding emission source. For example, the EPRI can be used to distinguish pulse trains of this emitter from those of other emitters of the same type.

In some embodiments, a non-coherent technique is used to determine fundamental inverse GPRIs (IPRIs). For example, non-coherent techniques can be used when PRF data and associated measurement uncertainties ($\sigma$'s) are measured from disjoint clusters of pulses, each with a different or the same PRF, to find the fundamental IPRI. Such non-coherent techniques can also be used with bursts of constant PRI data by converting the PRIs to corresponding PRFs and deriving the $\sigma$'s. Such techniques can be used to iteratively find the correct IPRI search range, and are unaffected by gaps in the data. The results may be converted into the time domain for use as an informed search range for coherent techniques based on the original TOA data. In some such embodiments, the non-coherent techniques are used to obtain a specific ID of a pulse Doppler emitter when the data is not coherent from pulse burst to pulse burst. With non-coherent techniques, there can be numerous combinations of overlapping intervals of PRF data, leading to many corresponding intersection intervals of IPRI data (e.g., multiple ambiguous IPRI values). Accordingly, in some such embodiments, statistical tests are used to find the best candidate IPRI intersection interval with which to proceed.

In some embodiments, the non-coherent techniques eliminate fragmentation or failure to find the true train caused by too narrow an IPRI tolerance. In addition, the techniques reject false hypotheses caused by excessive IPRI tolerance or a high missed PRF threshold for a train. Further, the techniques automatically test the derived IPRI against submultiples of the IPRI, since if an IPRI satisfies the PRFs of a train, then so does N×IPRI, where N is an integer.

In some embodiments, the techniques measure the GPRI of a single train to provide an additional discriminant to resolve ambiguous IDs of emitters of the same type. It should be noted that in such techniques, increasing the train length increases the precision of the GPRI measurement.

Further, such techniques are effective despite large gaps in the data, and can measure the GPRI in the presence of jitter. In addition, such techniques can use GPRIs to deinterleave pulse trains, even if the trains jitter and have the same or very similar GPRIs. Such techniques exploit their ability to deal with gaps to increase the time baseleg and measure the GPRI with SEI precision (in some embodiments, better than picosecond resolution). Moreover, in some embodiments, the techniques operate non-coherently to measure IPRI on discrete pulse bursts from an emitter, and such measured IPRIs can be used as an ID discriminant as well.

Numerous other example embodiments and configurations will be apparent in light of this disclosure.

System Architecture

FIG. 1 is a schematic diagram of an example use case 100 of a sensor system 140 for building pulse trains of emission sources 110 and 120, according to an embodiment of the present disclosure. In FIG. 1, there are a number of emission sources 110 and 120 (such as pulsed radar systems) for emitting pulsed transmissions of electromagnetic radiation, such as pulsed radar emissions 130. The sensor system 140 (e.g., a radar warning sensor on an aircraft in the transmission path of the emissions 130) senses the pulses of the emissions 130, generating a time-of-arrival (TOA) record for each pulse received. The pulses are transmitted in bursts called trains from each of the emission sources 110 and 120. When sensed by the sensor system 140, the overlapping trains from the sources 110 and 120 produce an interleaved set of pulse trains from the emissions 130, together with other sensings such as noise, stray pulses, sidelobe or multipath pulses, and the like. While the sensor system is depicted as an aircraft in this example, the sensor system is not limited to aircraft such as planes or drones but can be any sensor platform where it is desirable to understand emission sources.

The period of pulse sensing collection is known as a dwell. In some embodiments, dwells are between 10 and 20 milliseconds (msec). Dwells should be long enough to capture all or most of a pulse train, but short enough to keep the coherency between pulses of the same emitter (e.g., same pulse train) and to avoid movement effects such as Doppler shift. Further, processing complexity can grow as a power (e.g., squared, cubed) of the number of TOAs, which can grow linearly with the length of the dwell. Accordingly, dwells of between 10 and 20 msec work well for most pulsed emission sources and use cases. The output of the sensing is a set of TOAs, which may contain interleaved trains from different emitters as well as noise and other non-train sensings. Further, pulse trains may only be partially sensed, both on the ends (e.g., initial or final pulses are outside the dwell) and in the middle (e.g., not sufficiently directed at the sensor system 140 to be sensed). Accordingly, the set of TOAs may include only subsets of the pulse trains, with arbitrary starting and ending points as well as gaps of unknown size in between.

Figure 2:
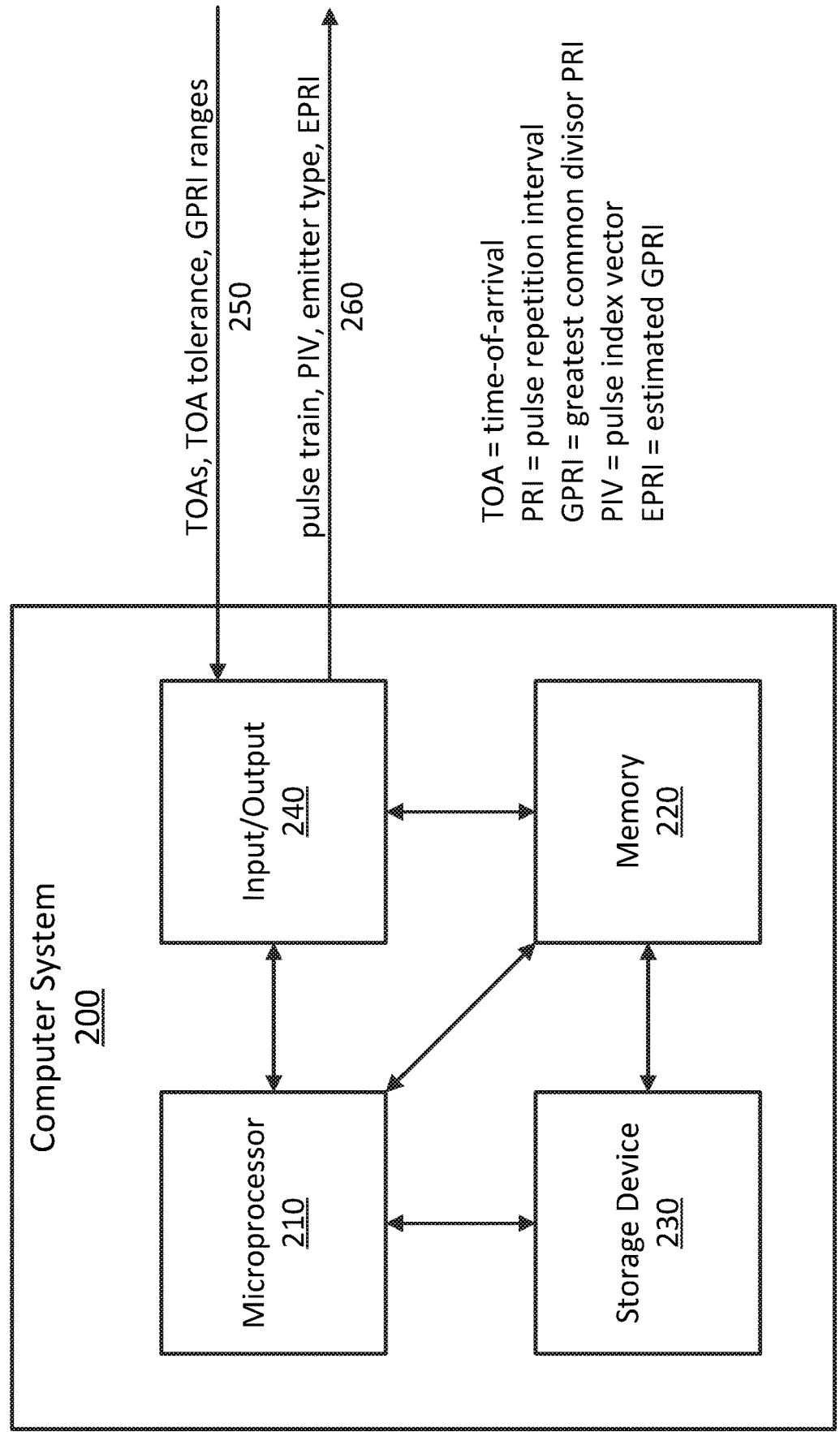
FIG. 2 is a block diagram of an example computer system for building pulse trains from sensed pulses, according to an embodiment of the present disclosure.

FIG. 2 is a block diagram of an example computer system 200 for building pulse trains 260 from sensed pulses (e.g., times-of-arrival or TOAs) 250, according to an embodiment of the present disclosure. The computer system 200 includes a microprocessor 210 for processing computer instructions and data, memory 220 for storing instructions being executed by and data being manipulated by the microprocessor 210, nonvolatile storage device 230 (such as a disk drive or flash memory or other random access memory (RAM)) for storing instructions and data over an extended period and when power is not being supplied to the computer system 200, and input/output 240 to represent various input and output devices and networks through which the computer system 200 interfaces with the rest of the world.

While in some embodiments, the techniques described herein are carried out, for example, by the computer system 200 of FIG. 2, that may be in close proximity to the sensing device or devices producing the TOAs 250, the present disclosure is not limited to such environments. In other embodiments, the sensing platforms are stationary. In some embodiments, the TOAs 250 are processed in close temporal and/or physical proximity to their sensing. In some embodiments, the TOAs 250 are processed sequentially in time order (such as forward or reverse order). In some embodiments, the TOAs 250 are received in time order. In some embodiments, the TOAs 250 are processed temporally and/ or physically separated from their sensing. In some embodiments, there is only one emitting source, the TOAs 250 representing primarily that source, albeit perhaps with noise or spurious pulses and perhaps missing pulses or gaps.

The computer system 200 and other electronic components and techniques described herein can be implemented as (or on, or instead of, or in addition to) an electronic processing component, such as a signal processor, a field programmable gate array (FPGA), a microprocessor, or the like. For example, the computer system 200 and other components or methods can be implemented in hardware or software, or some combination of the two. For instance, the computer system 200 can be implemented as illustrated, using a microprocessor 210 with instructions encoded therein (or through memory 220) that, when executed, cause the microprocessor 210 to carry out the tasks of the computer system 200. In another embodiment, the computer system 200 may be implemented as a custom circuit such as a field programmable gate array (FPGA) configured to carry out these tasks. In a further example, there are one or more memory units 220 (such as nonvolatile memory units) that is or are coupled to the processing component (e.g., microprocessor 210), and possibly one or more nonvolatile storage devices 230.

For example, the computer system 200 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

In addition, for ease of description, most of the described embodiments refer to the emission sources as pulsed radar transmitters, and the sensing platform(s) as radar detector(s). However, the present disclosure is not limited to such. For example, in other embodiments, the emission sources are communication devices using pulsed communication protocols that have pulse patterns and PRIs much like pulsed radar systems. In still other embodiments, the pulses of electromagnetic radiation can be other forms of electromagnetic radiation (e.g., communication signals, light, microwaves, or the like) that are being sensed by the sensing platform(s).

Referring to FIG. 2, input records, such as times-of-arrival (TOAs) and emitter type parameters such as GPRI ranges along with a measurement tolerance 250 are received by the computer system 200 through input/output 240 (e.g., over a wired or wireless network, or through a dedicated channel to the sensing device, or the like). Each TOA is a specific time when a sensing device sensed a corresponding pulse of electromagnetic radiation. In some embodiments, the TOAs are adjusted for Doppler effect, or acquired by multiple sensing devices. In some embodiments, the TOAs 250 are acquired over a relatively brief period (a dwell), such as between 10 and 20 msec. The TOAs 250 include all or most (or significant portions) of sensed pulses from pulse trains that come from emitting sources of interest. There may be gaps in the trains as well as spurious pulses (e.g., multipath, sidelobe, and the like) or noise so that only portions, and not necessarily contiguous or consecutive portions, of the pulse trains are present, all intermixed with each other and the other spurious signals or pulses. In some embodiments, to the computer system 200, the TOAs 250 look similar, namely a precise time estimate of when a pulse was sensed by a sensor.

The microprocessor 210 processes the TOAs 250 using emitter type parameters (such as GPRI ranges) and the measurement tolerance 250, identifying the next pulse train, pulse index vector (PIV), emitter type, and estimated PRI (EPRI). Example techniques for performing this processing are described in further detail below.

Figure 3:
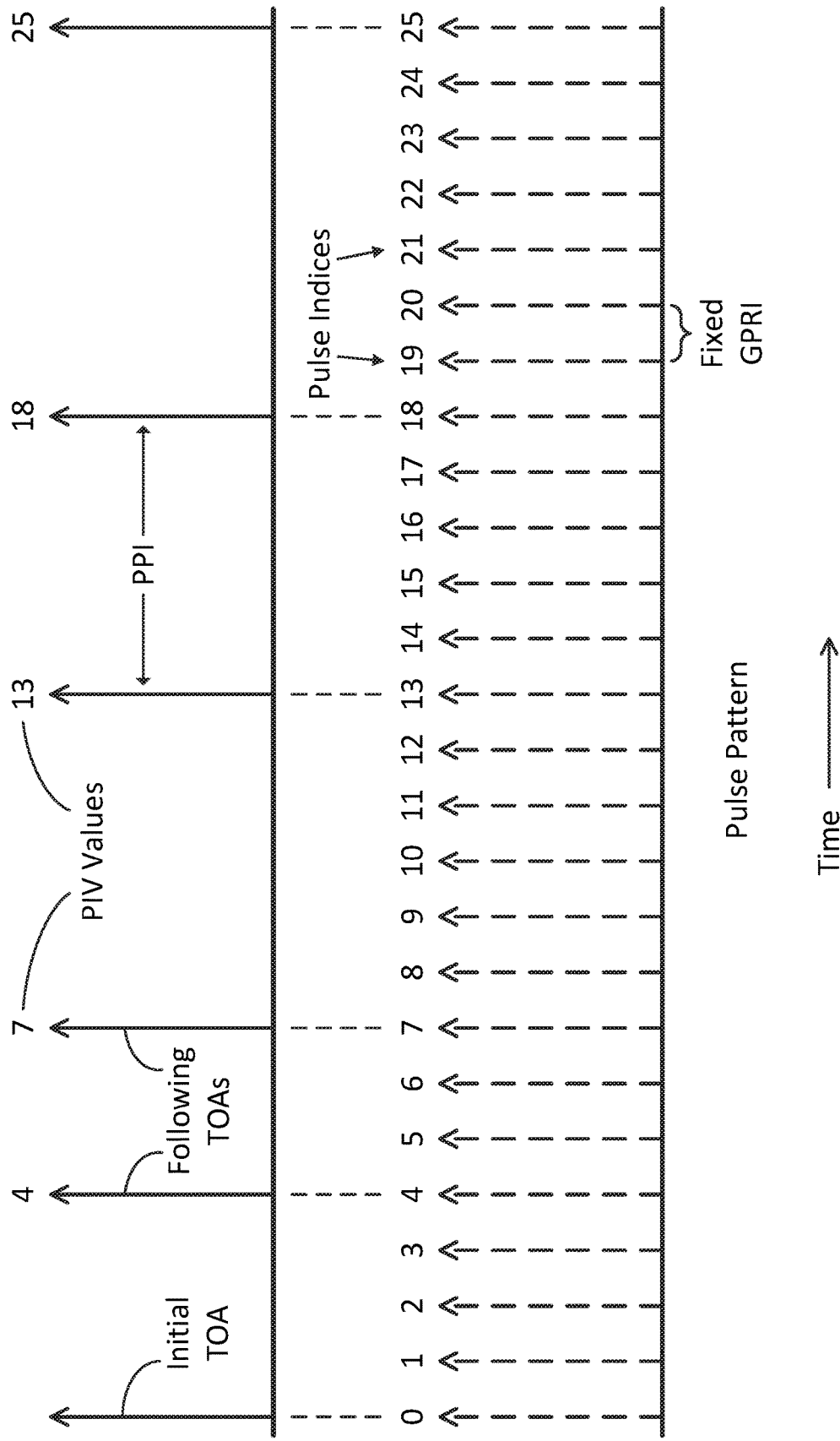
FIG. 3 is a timeline view of example times-of-arrival (TOAs) from corresponding emitted pulses of a pulse train emitted using a variable pulse-to-pulse interval (PPI) compared against a fixed greatest common divisor pulse repetition interval (GPRI) pulse pattern used to generate the emitted pulses.

FIG. 3 is a timeline view 300 of example TOAs from corresponding emitted pulses of a pulse train emitted using a variable pulse-to-pulse interval (PPI) compared against a fixed greatest common divisor PRI (GPRI) pulse pattern used to generate the emitted pulses. The timelines illustrate six TOAs (on the top timeline) representing six emitted pulses in the pulse train. The top timeline illustrates the six TOAs as vertical arrows with time moving from left to right. The six TOAs include an initial TOA and five following TOAs. The five following TOAs also have five corresponding pulse indices (PIV values) respectively labeling the following TOAs by their time difference from the initial TOA. The PPIs between pulses (e.g., differences between consecutive TOAs) are variable in the top timeline, each PPI taking on a different value between three and seven. The bottom timeline illustrates the corresponding fixed PRI pulse pattern, including 26 separate dashed arrows and corresponding pulse indices from 0 to 25, used to generate the six emitted pulses at pulse indices 0, 4, 7, 13, 18, and 25. The leftmost pulse (pulse index=0, corresponding to the initial TOA) of the top and bottom timelines are aligned for ease of illustration and comparison.

In some embodiments, the pulsed emissions form pulse trains generated from pulse patterns whose PRIs are fixed and identify the corresponding emitter types of the emitters that generate the pulse trains. In FIG. 3, the pulse train in the top timeline represents a portion of a pulse train that over time is emitted by an emission source having variable PPIs generated from a pulse pattern whose PRI is fixed in the bottom timeline. While the TOAs are shown in FIG. 3 aligned with their corresponding pulse pattern pulses for ease of description and illustration, actual TOAs can vary by as much as a known measurement error tolerance from such values. Accordingly, measured TOA PPIs may not necessarily be exact multiples of the PRI. However, since the measurement tolerance is fixed, over time its contribution to uncertainty in estimated values of the constant PRI diminishes. A consequence of this is that the more accurate the estimate of the constant greatest common divisor PRI (GPRI), and the closer the assignment of the PIV values to the pulse pattern, the smaller the errors in the pulse train from an ideal pulse train. Accordingly, longer pulse trains that maintain coherency between pulses and maintain viability with a known GPRI range of an emitter type can produce more accurate GPRIs. Further, techniques such as least squares fit can select a pulse train whose GPRI interval multiplied by the PIV vector has a smallest RMSE with respect to the measured TOA vector. This best fit point can be a very accurate estimate of the GPRI.

In practice, the TOAs represented in the set of TOAs do not all come from the same emission source, nor are all the TOAs that do come from the same emission source represented in the corresponding dwell or period of time represented by the TOAs. Put differently, the set of TOAs contains extraneous TOAs that are not from the emitter of interest, and not all pulses emitted by the emitter of interest during the sensed dwell are represented in the set of TOAs (e.g., there are gaps in places) Accordingly, being able to separate pulses (or their corresponding TOAs) that do not belong to the emitter of interest (or more precisely, the pulse train of interest) while being able to account for missing pulses (or their corresponding TOAs) when building the pulse train of interest are important obstacles to extracting a pulse train from a set of TOAs.

Figure 4:
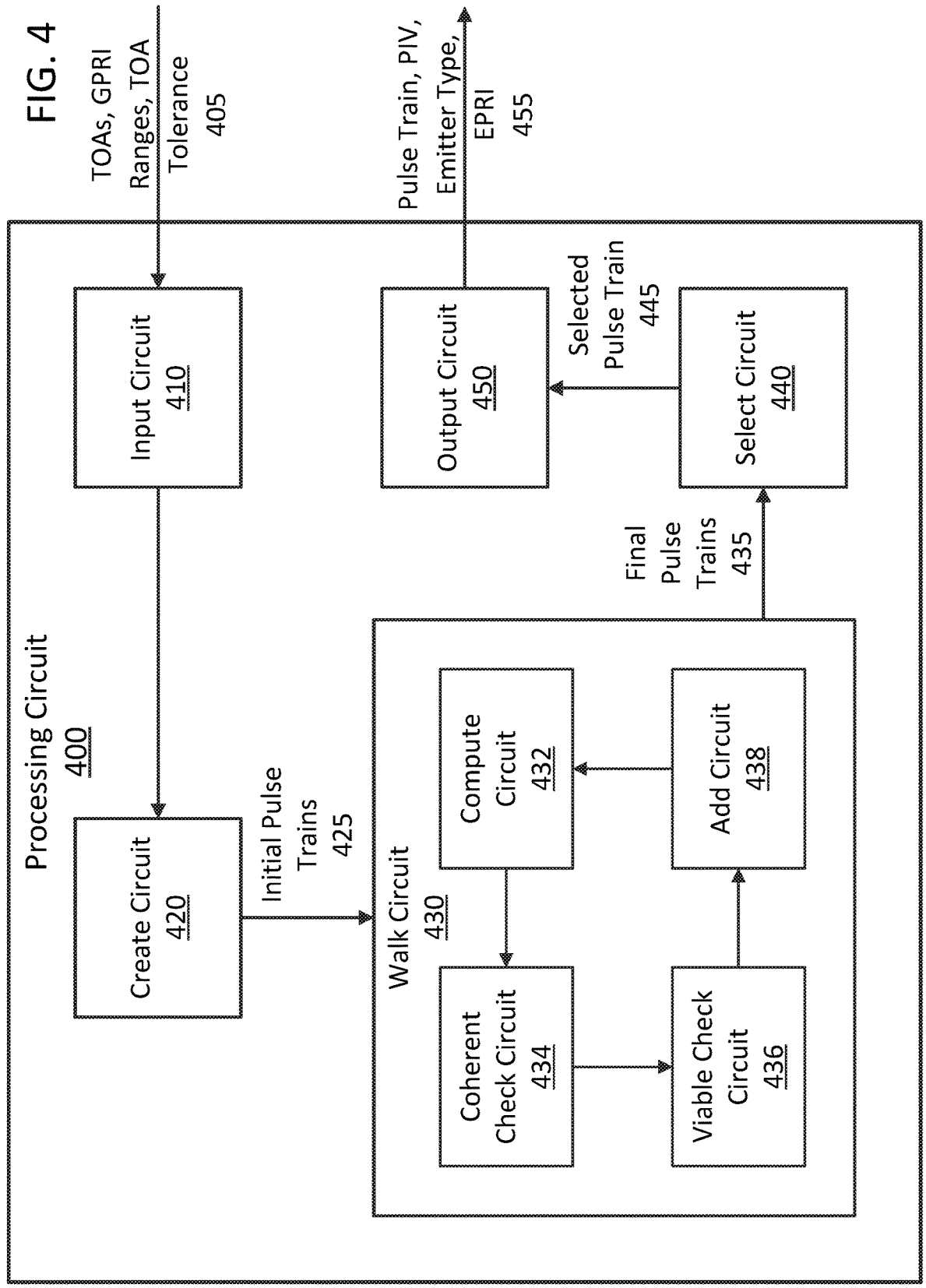
FIG. 4 is a block diagram of an example processing circuit for processing TOAs, such as for building a pulse train for deinterleaving the TOAs or identifying an emitter type, according to an embodiment of the present disclosure.

FIG. 4 is a block diagram of an example processing circuit 400 for processing TOAs 405, such as for building a pulse train 455 for deinterleaving the TOAs or identifying an emitter type, according to an embodiment of the present disclosure. The processing circuit 400 receives a set of inputs 405, including a set of TOAs and a set of emitter types including constant GPRI ranges for each emitter type as well as an error tolerance for measurement of the TOAs. The TOAs represent pulses of electromagnetic radiation. The processing circuit 400 outputs a set of outputs 455, including a pulse train, a corresponding PIV, an emitter type represented by the pulse train, and a GPRI estimate (EPRI) based on the pulse train. To this end, the processing circuit 400 includes an input circuit 410, a create circuit 420, a walk circuit 430, a select circuit 440, and an output circuit 450.

In further detail, the input circuit 410 receives the TOAs, emitter types, GPRI ranges, and a measurement error tolerance 405 from, for example, a sensor generating the TOAs together with a database of known emitter types and corresponding GPRI ranges. In some embodiments, additional parameters are provided (and used, for example, for pulse train building), such as a maximum PPI length (or equivalent maximum number of pulse indices) between consecutive emitted pulses of emitters of that emitter type. In some embodiments, the input circuit 410 receives the inputs 405 over one or more networks and/or channels connected to the corresponding sources of the TOAs, emitter types, GPRI ranges, and tolerance 405. The input circuit 410 passes these inputs to the create circuit 420, possibly repackaging them in the process (e.g., time ordering the TOAs, reformatting the ranges, and the like). The create circuit 420 creates initial or candidate pulse trains 425 for each emitter type. Each pulse train includes an initial TOA (which serves as a base or reference for the other TOAs) and a vector of following TOAs, together with a corresponding pulse index vector (PIV). The PIV maps the TOA vector into a pulse pattern having the fixed PRI whose value identifies the emitter type. The mapping involves finding the greatest common divisor PRI (GPRI) that, when multiplied by the PIV integers, produces a set of TOAs close to the measured TOAs. A known range of the GPRI for the emitter type is provided as an input 405 to the processing circuit 400 as well as a known measurement error tolerance of the TOAs. The GPRI is also estimated from the pulse train building process. The pulse indices in the PIV are determined to maintain coherency between TOAs and the known measurement error tolerance of the TOAs as well as to maintain consistency (or viability) with the known range of the GPRI for the corresponding emitter type.

In even further detail, in some embodiments, coherency is maintained when the known measurement error tolerance and the PIV of the pulse train define a corresponding tolerance region whose width shrinks with the increasing pulse indices of the PIV. In some such embodiments, the width of the tolerance region shrinks in proportion to the increasing pulse indices of the PIV. In addition, the initial TOA, the TOA vector, and the PIV of the pulse train define a corresponding estimated GPRI (EPRI) that converges to the fixed GPRI value of the pulse pattern for the emitter type. Further, the GPRI and its tolerance for each baseline of the pulse train define a series of nested or overlapping GPRI intervals (e.g., each GPRI interval is partially or completely contained in every previous (shorter) baseline's GPRI interval of the pulse train). Moreover, checking the coherence of the pulse train includes determining that the midpoint (e.g., estimated GPRI, or EPRI for short) of every longer baseline's GPRI interval falls within every shorter baseline's GPRI interval. Furthermore, viability (or consistency) is maintained for the extended pulse train with the known GPRI range when each baseline's GPRI interval overlaps the known GPRI range (at least in part). This is a non-coherent test.

The walk circuit 430 takes the initial pulse trains 425 created by the create circuit 420 and walks them through the remaining TOAs of the set of TOAs in time order, to extend the pulse trains to achieve the longest possible length coherent with the TOAs already in the pulse train (and known measurement tolerance of the TOAs) and viable with the emitter type of the pulse train. To this end, the walk circuit 430 includes a compute circuit 432, a coherent check circuit 434, a viable check circuit 436, and an add circuit 438. For each pulse train, the walk circuit 430 walks through the plurality of TOAs in time order starting right after the first two TOAs used to construct the initial GPRI and its tolerance. In some embodiments, for each next TOA, the compute circuit 432 computes a next pulse index mapping the next TOA into the pulse pattern used to generate the emitted pulses from the emitter.

The coherent check circuit 434 checks if the GPRI of the pulse train extended by the next TOA and the next index is coherent with the (nonextended) GPRI of the pulse train and the known TOA measurement error tolerance. In some embodiments, this includes determining a pulse index for the extended baseline, and from it and the TOA measurement error, determining the GPRI and its next tolerance. The nested property of the GPRI intervals preserves the coherency. If the train is coherent, the midpoint of each new GPRI interval falls inside of a GPRI interval from every shorter baseline. Each longer baseline has a smaller GPRI tolerance region, since the pulse index that generates it is larger than for the shorter baseline.

The viable check circuit 436 checks if the extended pulse train is consistent with the known input range of the GPRI (e.g., whether the emitter type is still viable for the extended pulse train). In some embodiments, this includes checking if the next GPRI interval still overlaps the known range of the GPRI (at least in part). This is a non-coherent test. The goal of the walk circuit 430 is to produce long pulse trains that have both a coherent set of TOAs (e.g., pulse indices in their corresponding PIVs that when multiplied by the GPRI yield the set of measured TOAs) and a viable GPRI interval (e.g., overlaps the known range of the GPRI for the candidate emitter type). If both checks pass, the add circuit 438 adds the next TOA and the next pulse index to the pulse train, updating the GPRI tolerance interval by finding the region of overlap of the previous GPRI tolerance with the newly qualified one. Otherwise, the add circuit 438 skips considering this TOA any further for this pulse train. Processing continues with the next TOA in time order (from the set of TOAs) and with the compute circuit 432, until all TOAs have been considered or the pulse train has rejected so many pulses that it cannot achieve a minimum threshold number of pulses, in which case it is rejected.

The walk circuit 430 outputs a set of final pulse trains 435 for consideration by the select circuit 440. The select circuit 440 selects one such pulse train and outputs it as a selected pulse train 445. In different embodiments, the select circuit 440 uses one or more of a set of different criteria for selecting a pulse train. For example, in some embodiments, pulse trains are selected if they achieve a given minimum length (or longer), such as a fraction of the total number of TOAs (or a fraction of the total number of TOAs after the initial TOA). The fraction can vary with the number of expected pulse trains in the set of TOAs, such as using two-thirds (or 70%) if it is believed only one emitter is being sensed, but using one-third (or 30%) if two emitters are being sensed, and so on. Other criteria include selecting the pulse train with the most number of TOAs, the pulse train whose last estimated GPRI (EPRI) is closest to the midpoint of the known GPRI range, or the pulse train whose last GPRI interval multiplied by the PIV vector has a smallest root mean square error (RMSE) with respect to the measured TOA vector.

The output circuit 450 outputs a set of outputs 455, such as the selected pulse train, including one or more of the TOAs, PIV, emitter type, GPRI estimate and its tolerance, and the like. Depending on the application, other actions may also take place. For example, in some embodiments, the processing circuit 400 does deinterleaving, so after identifying the selected pulse train 445, the set of TOAs is depopulated by removing the TOAs in the selected pulse train 445. The remaining TOAs (in the depopulated set) can then be run through the processing circuit 400 again to identify the next best pulse train, the remaining TOAs further depopulated, and so on.

Methodology

Figure 5A:
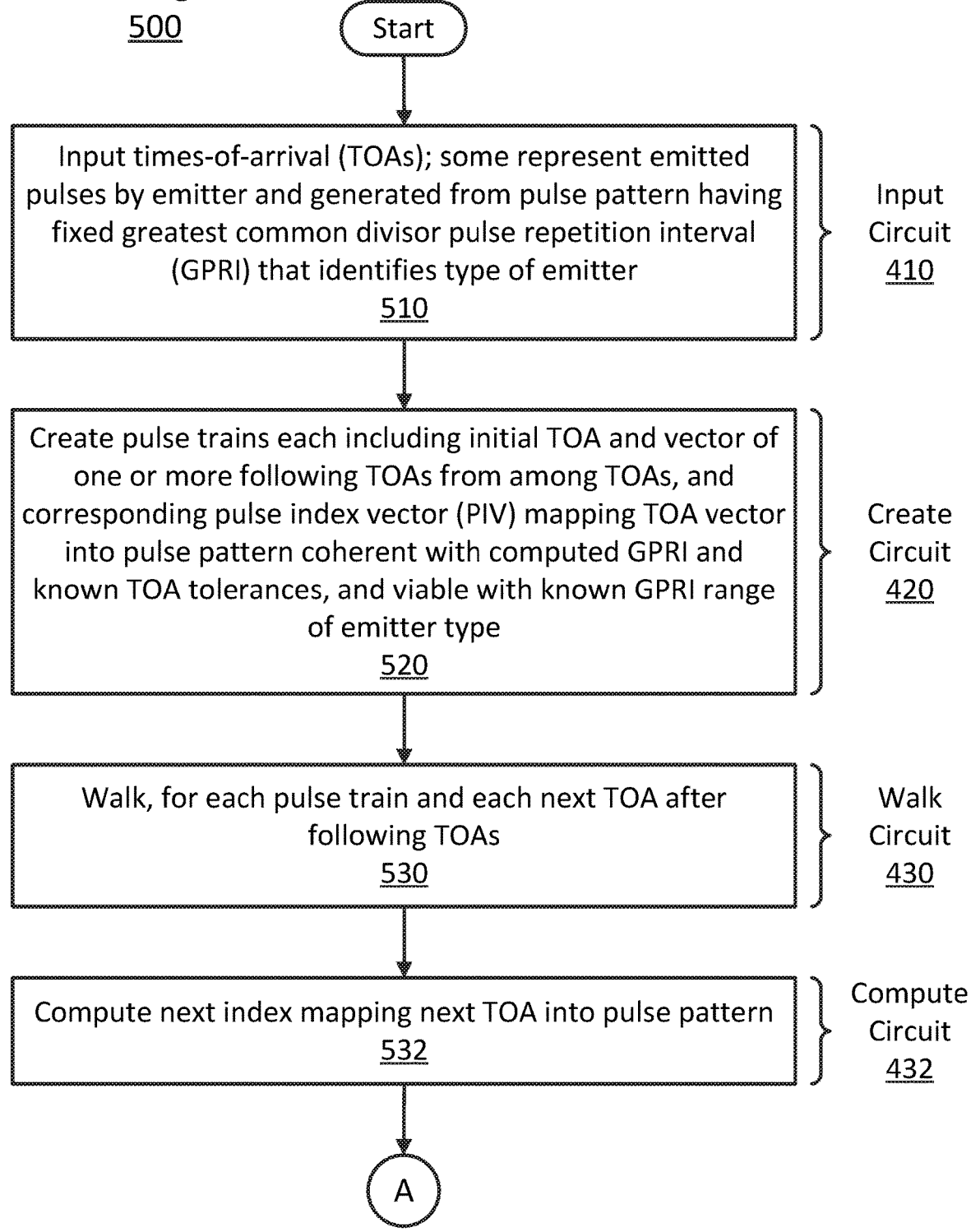
FIGS. 5A-5B are a flow diagram of an example method of processing TOAs, such as with the processing circuit of FIG. 4, according to an embodiment of the present disclosure.
Figure 5B:
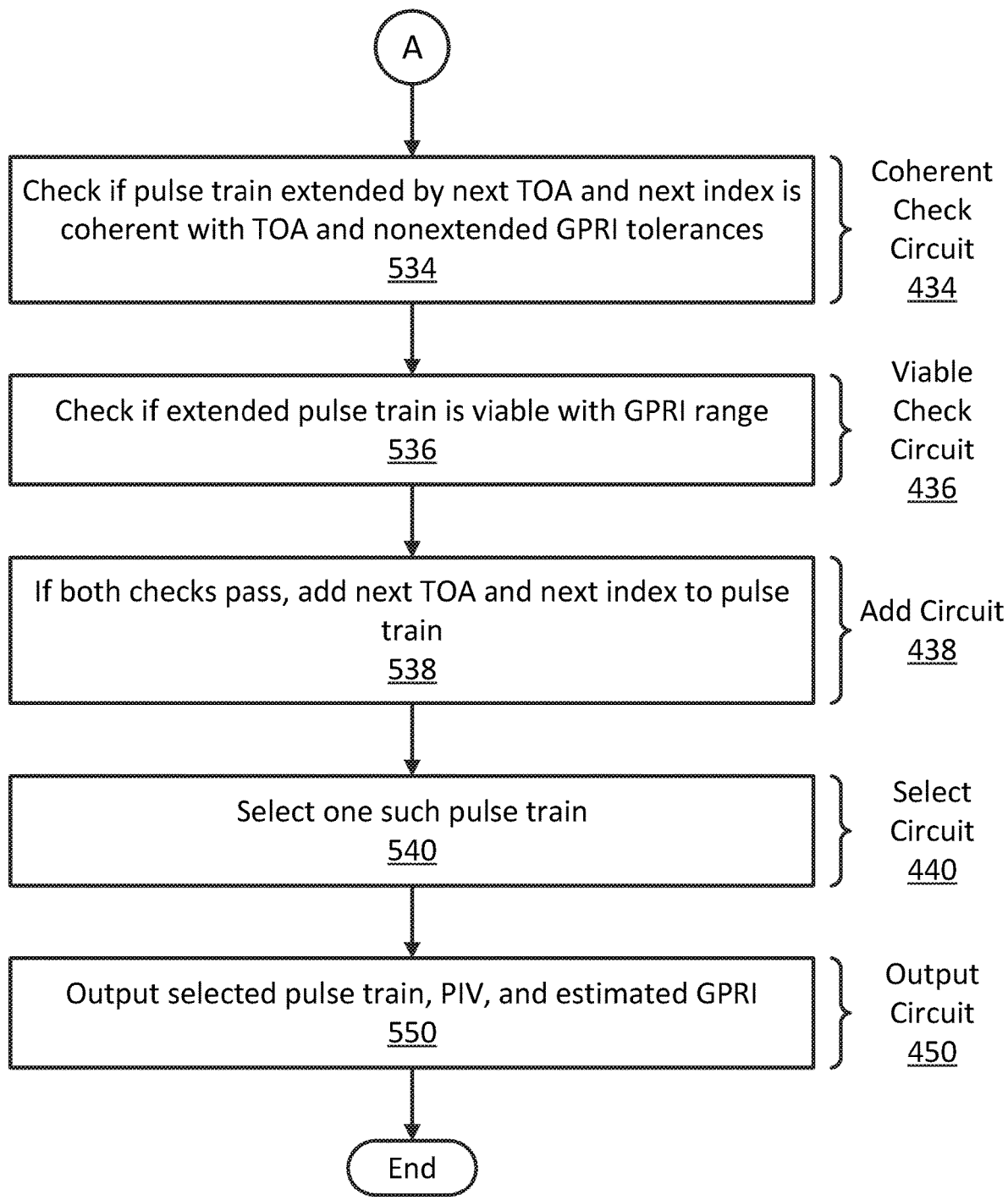

FIGS. 5A-5B are a flow diagram of an example method 500 of processing TOAs, such as with the processing circuit 400 of FIG. 4, according to an embodiment of the present disclosure. The method 500 may be performed, for example, by the computer system 200 of FIG. 2 and the processing circuit 400 of FIG. 4. More generally, the method 500 and other methods described herein may be implemented in hardware or combinations of hardware and software. For example, the method 500 may be implemented using the components or techniques of FIGS. 1-4. In another embodiment, the method 500 may be implemented by or in conjunction with a custom circuit such as an FPGA configured to carry out all or most of method 500. In other embodiments, the method 500 may be performed in conjunction with a special purpose processor, such as a signal processor.

In some other embodiments, some or all of the method 500 may be implemented as a series of computer instructions, such as software, firmware, or a combination of the two, together with one or more computer processors (e.g., one or more microprocessors). The instructions, when executed on a given processor, cause portions of the method 500 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 500 (or other method described herein) to be carried out for processing TOAs (e.g., building pulse trains from emission sources). In addition, while the methods described herein may appear to have a certain order to their operations, other embodiments may not be so limited. Accordingly, the order of the operations can be varied between embodiments, as would be apparent in light of this disclosure.

In method 500, processing begins in FIG. 5A with inputting 510 (such as with input circuit 410) times-of-arrival (TOAs). Some of the TOAs represent emitted pulses (such as the emitted pulses in FIG. 3) by an emitter (such as emission source 110). These emitted pulses are generated from a pulse pattern (such as the pulse pattern in FIG. 3) having a fixed greatest common divisor pulse repetition interval (GPRI) that identifies a type of the emitter. The method 500 further includes creating 520 (such as with the create circuit 420) pulse trains. Each pulse train includes an initial TOA and a vector of one or more following TOAs from among the TOAs. Each pulse train further includes a corresponding pulse index vector (PIV) mapping the TOA vector into the pulse pattern. This mapping is coherent with the pulse train GPRI and the known TOA measurement error tolerance, and viable with the known range of the constant GPRI of the emitter type.

The method 500 further includes walking 530 (such as with the walk circuit 430), for each pulse train and each next TOA after the following TOAs in the pulse train. This walking 530 includes computing 532 (such as with compute circuit 432) a next (pulse) index mapping the next TOA into the pulse pattern. Continuing with FIG. 5B, the method 500 (and in particular, the walking 530) further includes checking 534 (such as with coherent check circuit 434) if the GPRI computed from the pulse train extended by the next TOA and next index is coherent with that of the prior-to extending pulse train and the known measurement error tolerance of the TOAs. The walking 530 further includes checking 536 (such as with viable check circuit 436) if the extended pulse train is consistent with the known input GPRI range, and, if both checks pass, adding 538 (such as with add circuit 438) the next TOA and next index to the pulse train, and recalculating the GPRI region as the intersection of the tolerance regions of the previous (before extending) and extended pulse trains. The method 500 further includes selecting 540 (such as with select circuit 440) one such pulse train, and outputting 550 (such as with output circuit 450) the selected pulse train, the PIV, and an estimated GPRI.

EXAMPLE EMBODIMENT

In another example embodiment of the present disclosure, a method of building a pulse train, such as for deinterleaving or identification of an emitter, is provided. The method may be performed, for example, by the computer system 200 of FIG. 2 and the processing circuit 400 of FIG. 4. The method has several inputs: a time-ordered set of TOAs ($T_1$, $T_2$, ..., $T_M$), a set of emitter types ($E_1$, $E_2$, ..., $E_N$) having a good likelihood of generating the sensed pulses represented by the TOAs, and a measurement error tolerance $\varepsilon$ of the TOAs. The measurement tolerance $\varepsilon$ represents the largest possible time difference between the measured arrival time of any TOA and its true arrival time. Each emitter type $E_A$ (A=1, 2, ..., N) has a GPRI range=$[L_A, H_A]$ placing lower and upper bounds of the allowable GPRIs that can define a pulse pattern used to generate pulse trains from emitters of that type. Stated differently, time differences between emitted pulses of emitters of that type are integer multiples of this constant GPRI. By extension, time differences between corresponding TOAs of these emitted pulses are also integer multiples of this GPRI, subject to (e.g., plus or minus) the measurement error tolerance $\varepsilon$. While the specific GPRI value can be unknown, the GPRI range is known, as is the measurement tolerance $\varepsilon$.

The method attempts to output the longest coherent pulse train (considering the measurement error tolerance $\varepsilon$) associated with a pulse pattern consistent (or viable) with the GPRI range of one of the emitter types. Here, longest refers to the pulse train having the largest number of TOAs (from the input set of TOAs) associated with it, together with a corresponding pulse index vector (PIV) mapping such TOAs to the pulse pattern of the emitter type. In some embodiments, further outputs are provided, such as the emitter type, the estimated GPRI of the emitter, and the like. Further, in some embodiments, different criteria can be used in place of or in addition to the most number of TOAs to select the output pulse train. These include criteria such as selecting a pulse train whose size (in TOAs) meets or exceeds a certain threshold (e.g., a threshold based on a given fraction of the number of TOAs, such as one half, two thirds, one third, and the like), and selecting a pulse train whose estimated GPRI is closest to the midpoint of the known GPRI range, to name a few criteria. Other criteria will be apparent in light of this disclosure.

With using certain criteria to include or select particular candidate pulse trains, complementary criteria can be used to exclude particular candidate pulse trains (or force such candidate pulse trains to be rejected). For instance, in some embodiments, candidate pulse trains can be thrown out when they fail to (or it becomes apparent that they cannot) reach a certain threshold size, or when they skip too many total or too many consecutive TOAs, depending on the application. In some embodiments, otherwise good candidate pulse trains can be rejected once they skip too many consecutive or too many total TOAs.

The general approach of the method is to systematically generate candidate pulse trains, throwing out short pulse trains until the longest pulse train remains. In some embodiments, only the most likely candidate pulse trains are explored. In some embodiments, generating stops once a sufficiently long pulse train is generated. Candidate pulse trains are built one TOA at a time, maintaining coherency between TOAs (taking into account the measurement error tolerance) with respect to a GPRI and viability (consistency) with respect to the GPRI ranges of their corresponding emitter types at each new TOA. In some embodiments, this generation of candidate pulse trains is done as several nested loop iterations, such as an outer loop to process the different emitter types, two middle loops to process the first two TOAs of the pulse train, and one or two inner loops to process the remaining TOAs in the pulse train. It will be appreciated that the number and arrangement of loops can be varied between embodiments as would be apparent in light of this disclosure.

In some embodiments, to initialize each candidate pulse train, a GPRI range for an emitter type $E_A$, A=1, 2, . . . , N, where N is the number of emitter types, is selected in the outermost loop. The first middle loop includes initializing the first pulse of a candidate pulse train as $T_I$, where the index I may range over I=1, 2, . . . , $I_{max}$. The initial TOA of a pulse train provides an anchor with which the following TOAs are compared. Here, $I_{max}$ may be chosen small (such as 2 or 5, as in a user configurable setting) to minimize the search space, given the relatively small likelihood that the longest pulse train, or the first train in a deinterleaving case, skips all the first several TOAs. The next middle loop of the method includes iterating over J=I+1, I+2, . . . , $J_{max}$, where $T_J$ is the second pulse of the candidate pulse train (that is, the first of the following TOAs in the TOA vector). In some embodiments, the following TOAs are organized as a vector of following TOAs (a TOA vector) for the pulse train. This is for convenience of description, as many of the concepts are described in terms of the relationships that each of the following TOAs has with the initial TOA (or, for that matter, with the initial two TOAs in the candidate pulse train). Accordingly, in some other embodiments, all the TOAs for the pulse train are organized in the same vector, as would be appreciated in light of this disclosure.

$J_{max}$ may be chosen small (such as 2 or 5, or I+2 or I+5, as with another user configurable setting) to further reduce the search space, given the relatively small likelihood that the longest pulse train skips numerous TOAs at the beginning of the pulse train. Each I and J in the middle loops define an initial TOA ($T_I$) and an initial TOA vector [$T_J$] for the pulse train. If the pulse train formed from these two TOAs does not prove viable, the J index is incremented by 1 and the process is repeated with the I and J pulses. If there is still no success and J has reached its maximum value, then the I index is incremented by 1, J is set to I+1, and the process is repeated. From the time difference between the I and J TOAs (called the IJ baseline), the maximum measurement error P and the selected emitter's GPRI range, the maximum and minimum possible integer (pulse index) values associated with the GPRI range are computed. For each integer (pulse index) between the maximum and the minimum, a candidate greatest common divisor PRI (GPRI) with its tolerance range (forming a candidate GPRI interval for the IJ baseline) are computed from the IJ baseline, the pulse index (integer), and ε. Each of these represents the beginning pulses and associated pulse index (integer) in a candidate train. To flesh out the rest of each pulse train, an inner loop iterates over each of the remaining TOAs in the TOA measurement set, $T_K$, where K ranges from J+1 to the end of the set of TOAs. In some embodiments, the baseline interval from $T_I$ to $T_K$ is computed, called the IK baseline. The IK baseline and the candidate GPRI interval are used to compute an associated pulse index (integer) for the IK interval. A candidate GPRI and its tolerance for the IK interval are computed from the pulse index (integer), the IK baseline, and ε. The candidate GPRI and its tolerance form an interval for the IK baseline that is tested for coherency and viability with the candidate GPRI interval from the IJ baseline. If the tests are passed, the candidate GPRI intervals from the IJ and IK baselines are combined by intersecting the tolerance intervals and the result is used to apply to the next baseline IK generated after incrementing K by 1. The $K^{th}$ TOA and the associated pulse index (integer) are stored as part of the candidate pulse train. If either of the tests is not passed, the pulse is rejected and the K+1$^{th}$ pulse is analyzed in the same way. At the end of the process, the final constant GPRI interval is the greatest common divisor of all the baselines $T_K - T_I$.

To maintain coherency and viability, other structures are set up, and described in terms of vectors for ease of description, though their actual organization can vary between embodiments as would be apparent in light of this disclosure. The first such vector is the TOA vector, which contains the TOAs of the pulses that are included in the candidate pulse train. The second such vector is the pulse index vector (PIV), which corresponds to the TOA vector, and contains a set of pulse indices (integers) that map each of the following TOAs into the pulse pattern used to generate pulse trains for emitters of type $E_A$ relative to the initial TOA. Here, the initial TOA can be thought of as having pulse index 0. For each pair of TOAs ($T_I$ and $T_J$) and each emitter type $E_A$, there can be several different pulse indices that produce viable initial pulse trains (corresponding to the integers between the maximum and minimum integers found for the IJ baseline), and separate initial pulse trains are formed for each. Put another way, the initial TOA, the TOA vector (of following TOAs), the GPRI range, and the PIV are unique to each candidate pulse train.

To initialize the PIV, the GPRI range [$L_A$, $H_A$] and the measurement tolerance ε are used in conjunction with the time difference ($T_J - T_I$) between the first two TOAs to generate all the viable pulse indices, each of which forms a separate candidate pulse train. For ease of description, it will be assumed that any two TOAs differ by more than the measurement error tolerance g. The measurement tolerance ε defines the largest error between the measured time-of-arrival of a pulse and the actual TOA for that pulse. In addition, the actual difference in emission times is a multiple of the GPRI for the emitter type $E_A$, whose value is assumed to be unknown but that is bounded by the GPRI range [$L_A$, $H_A$]. Accordingly, the smallest possible viable pulse index $X_{min}$ can be calculated as $X_{min} = \lceil [(T_J - T_I) - \varepsilon]/H_A \rceil$ and the largest possible viable pulse index $X_{max}$ can be calculated as $X_{max} = \lfloor (T_J - T_I) + \varepsilon]/L_A \rfloor$. If $X_{min} > X_{max}$, there are no viable pulse indices for the TOAs ($T_I$ and $T_J$) and this emitter type $E_A$. If $X_{min} = X_{max}$, there is only one viable pulse index. If $X_{min} < X_{max}$, there are multiple viable pulse indices ($X_{max} - X_{min} + 1$ such indices from $X_{min}$ up to $X_{max}$), each establishing a different candidate pulse train. This process is repeated across all the emitter types to create the initial candidate pulse trains.

Once the pulse indices are determined, they establish an estimated PRI (EPRI) for each pulse train, namely EPRI= $(T_J - T_I)/X$, where X is the corresponding pulse index for the pulse train. These EPRIs can also be maintained in their own vector (an EPRI vector), as with the PIV, one entry for each TOA in the TOA vector. The EPRIs in the EPRI vector will converge to the GPRI of the emitter type for any candidate pulse train that represents an actual set of pulses emitted by an emitter of that type. The pulse indices also establish a shrinking tolerance for each baseline of each pulse train by first calculating ε/X, where X is the corresponding pulse index for the baseline's pulse train and ε is the measurement tolerance for the TOAs. The tolerance region for the $K^{th}$ baseline is intersected with the tolerance region of the K−1 baselines that preceded it to yield a tolerance region that is common to all pulse baselines in the train, thus shrinking the size of the tolerance region as more pulses are added to the train. The shrinking tolerances can also be maintained in their own vector (a tolerance vector), as with the PIV and the EPRI vector. For each pulse train having a particular emitter type, the shrinking tolerances represent the range of values the GPRI can have from the possible GPRIs for that emitter type. Put mathematically, the shrinking tolerances define a GPRI interval [EPRI−ε/X, EPRI+ε/X] within which the true GPRI for the emitter type must fall. The GPRI intervals can also be maintained in their own vector (a GPRI interval vector), as with the PIV, the EPRI vector, and the GPRI tolerance vector.

The method further includes one or more inner loops for extending the candidate pulse trains initialized from the outer and middle loops. The inner loops include iterating over K=J+1, J+2, . . . , M, where $T_K$ is the next TOA under consideration for extending each of the candidate pulse trains. In further detail, for each candidate pulse train from emitter type $E_A$ having initial TOA $T_I$, and TOA vector $[T_J]$ with corresponding PIV $[X_J]$, corresponding EPRI vector $[(T_J-T_I)/X_J]$, corresponding GPRI tolerance vector $[\varepsilon/X_J]$, and corresponding PRI interval vector $[[Y_J, Z_J]]$, extend the candidate pulse train by TOA $T_K$ for each corresponding pulse index $X_K$ that satisfies the coherency and viability criteria.

In some embodiments, coherency is addressed first. In simple terms, coherency is satisfied by imposing a requirement on the GPRI intervals formed from each succeeding baseline $T_K-T_I$. That requirement is that the midpoint of each GPRI tolerance interval must fall within all GPRI tolerance intervals formed from shorter baselines $T_L-T_I$ where L<K. To achieve this, any pulse index $X_K$ under consideration for extending the pulse train by TOA $T_K$ must produce a corresponding EPRI that lies within all the previous GPRI intervals. Put another way, $EPRI_K$ must be contained in the interval $[Y_L, Z_L]$ where L<K. In other words, $Y_L \leq (T_K-T_I)/X_K \leq Z_L$. As before, there may be no such pulse index $X_K$, in which case the pulse train cannot incorporate $T_K$ (so processing for this pulse train resumes with considering TOA $T_{K+1}$), or there may be one such pulse index $X_K$, in which case the PIV is extended by that pulse index, or there may be many such pulse indices $X_K$, in which case multiple pulse trains are created (or spawned), one for each such pulse index, with the PIV extended by that pulse index.

Each such pulse index $X_K$ produces a corresponding $EPRI=(T_K-T_I)/X_K$, a corresponding tolerance $\varepsilon/X_K$, and a corresponding GPRI interval $[EPRI-\varepsilon/X_K, EPRI+\varepsilon/X_K]$. To maintain coherence, this GPRI interval has to nest in or overlap the previous GPRI interval $[Y_L, Z_L]$, so the corresponding GPRI interval $[Y_K, Z_K]=[\max(EPRI-\varepsilon/X_K, Y_L), \min(EPRI+\varepsilon/X_K, Z_L)]$. This intersection process of GPRI intervals is also referred to as an intersection of tolerances. Thus, if the midpoint of a subsequent GPRI interval computed for baseline interval $T_{K+1}-T_I$ lies within $[Y_K, Z_K]$, it is guaranteed to lie within all previously computed GPRI intervals for the pulses in the train and the train is coherent. In addition, to maintain viability with the emitter type, the GPRI interval $[Y_K, Z_K]$ has to overlap (at least in part) with the known GPRI range $[L_A, H_A]$ of the emitter type $E_A$. If both the consistency and viability checks pass, the TOA vector is extended by the TOA $T_K$, the PIV is extended by the pulse index $X_K$, the GPRI tolerance vector is extended by the tolerance $\varepsilon/X_K$, the EPRI vector is extended by the $EPRI=(T_K-T_I)/X_K$, and the GPRI interval vector is extended by the GPRI interval $[Y_K, Z_K]$. In some embodiments, only the TOA vector and the PIV are maintained as vectors, with the EPRIs and their tolerances computed dynamically and the last GPRI interval saved (e.g., for use in constructing the next GPRI interval).

This pulse train extension process can be repeated for all the remaining TOAs and pulse trains, extending each train by the next TOA in similar fashion when there is at least one next pulse index such that pulse train extended by the next TOA and the next pulse index satisfy the coherence and viability checks. In addition, the corresponding structures (e.g., PIV, EPRI vector, and GPRI interval vector) are extended or maintained as appropriate for this extension. The process continues for each pulse train until one or more terminating conditions is reached, such as the pulse train being too short, or missing too many TOAs or consecutive TOAs, or other pulse trains being better, or running out of TOAs, to name a few. The shrinking GPRI tolerances make it more and more difficult for candidate pulse trains to be extended unless they are representative of pulse train emissions from emitters of the corresponding type. Accordingly, the process converges quickly on viable pulse trains after the initial candidate pulse trains are identified.

Repeating the above procedure generates candidate pulse trains from the set of TOAs and the different emitter types that have a high likelihood of corresponding to portions of actual pulse trains emitted from emitters of those types. The longest such pulse train in turn has the highest such likelihood. Accordingly, in some embodiments, the method further includes selecting and outputting the longest candidate pulse train (e.g., the pulse train having the most TOAs). Further, for a deinterleaving application, the TOAs from the longest candidate pulse train can be deleted from the input TOAs and the above process repeated on the remaining TOAs. The deinterleaving process can be repeated as many times as needed to assign or sort all or most of the input TOAs to an appropriate pulse train. In addition, for an identification application, after selecting and outputting the longest pulse train, the estimated GPRI for the corresponding emitter can be further refined by partitioning the tolerance interval into an arbitrary number of discrete GPRI values. Then for each value, the RMSE between the measured TOAs in the train and the product of that GPRI and each element in the PIV is computed. The GPRI value that yields the smallest RMSE is selected as the final value for that train. The tolerance is the width of the partition region.

In some embodiments, ambiguity pulse train processing is performed. Here, it is assumed that the TOAs and their corresponding pulses belong to the same emitter, with no contention between multiple emitters. Accordingly, single long pulse trains (such as a minimum of 70% of the TOAs or more) from a single emitter are sought. For this type of processing, too many consecutive TOAs or cumulative TOAs missed can be an indication that the candidate pulse train is unlikely, and such candidate pulse trains can be removed early rather than further explored. However, should this missing of consecutive or cumulative TOAs take place late in the candidate train building, such that the candidate pulse train has reached a sufficient length (such as 70% of the total number of TOAs), then the candidate pulse train can be output rather than removed. In other embodiments, deinterleaving is performed. Here, there can be many emitters and numerous overlapping (interleaved) pulse trains. Accordingly, shorter, but more complete pulse trains having a good correlation to a specific emitter are sought. For this type of processing, too many consecutive missed maximum PPIs (or equivalent number of missed pulse indices) or cumulative maximum PPIs missed (where maximum PPI is another input value supplied for an emitter type) can be an indication that the candidate pulse train is unlikely, or at least not the best candidate pulse train to be the first such pulse train to deinterleave from the remaining TOAs. As such, these candidate pulse trains can be removed early rather than further explored. However, should such candidate pulse trains have reached a sufficient length already, they may be output rather than removed.

Numerous other methods and techniques will be apparent in light of the present disclosure.

FURTHER EXAMPLE EMBODIMENTS

The following examples pertain to further embodiments, from which numerous permutations and configurations will be apparent.

Example 1 is a method of processing a set of times-of-arrival (TOAs), some of the set of TOAs representing emitted pulses by an emitter that are generated from a pulse pattern having a fixed greatest common divisor pulse repetition interval (GPRI) that identifies a type of the emitter, the method including: creating, by a processing circuit, a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type; walking, by the processing circuit, for each pulse train of the plurality of pulse trains, for each next TOA after the one or more additional TOAs from among the set of TOAs, and for each next pulse index mapping the next TOA into the pulse pattern, the walking including checking if the pulse train extended by the next TOA and the next pulse index is consistent with the TOA tolerance, checking if the extended pulse train is viable with the GPRI range, and if both checks pass, adding the next TOA and the next pulse index to the pulse train; and selecting, by the processing circuit, one of the plurality of pulse trains.

Example 2 includes the method of Example 1, wherein: a given pulse train is consistent with the TOA tolerance when the TOA tolerance and the PIV define a corresponding GPRI tolerance that shrinks with the increasing pulse indices of the PIV, the initial TOA, the TOA vector, and the PIV define a corresponding estimated GPRI (EPRI) that converges to the GPRI with the increasing pulse indices of the PIV, and all values within the GPRI tolerance of the EPRI define a corresponding GPRI interval whose intersection with a previous common GPRI interval defines a next common GPRI interval that includes the EPRI; and the given pulse train is viable with the GPRI range when the GPRI interval and the GPRI range overlap at least in part.

Example 3 includes the method of Example 2, wherein selecting one of the plurality of pulse trains includes one or more of: selecting one of the plurality of pulse trains having at least a given number of TOAs from the set of TOAs, or a given proportion of the set of TOAs; selecting one of the plurality of pulse trains having a largest number of TOAs from the set of TOAs; selecting one of the plurality of pulse trains whose EPRI is closest to the midpoint of the GPRI range; selecting one of the plurality of pulse trains whose EPRI multiplied by the PIV has a smallest root mean square error (RMSE) with respect to the TOA vector; and selecting one of the plurality of pulse trains whose GPRI interval contains a minimum RMSE point that when multiplied by the PIV has a smallest RMSE with respect to the TOA vector of any point in the GPRI interval and of the minimum RMSE point of any other of the plurality of pulse trains.

Example 4 includes the method of Example 2, wherein for each pulse train of the plurality of pulse trains, the GPRI tolerance shrinks in proportion to the increasing pulse indices of the PIV.

Example 5 includes the method of Example 1, wherein: the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains; others of the set of TOAs represent emitted pulses by a second emitter that are generated from a second pulse pattern having a fixed second GPRI that identifies a second type of the second emitter; creating the plurality of pulse trains includes creating a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type; walking further includes, for each pulse train of the second plurality of pulse trains, for each next TOA after the one or more additional TOAs from among the set of TOAs, and for each next pulse index mapping the next TOA into the second pulse pattern, checking if the pulse train extended by the next TOA and the next pulse index is consistent with the TOA tolerance, checking if the extended pulse train is viable with the second GPRI range, and if both checks pass, adding the next TOA and the next pulse index to the pulse train; and selecting one of the plurality of pulse trains includes selecting one of the first plurality of pulse trains or selecting one of the second plurality of pulse trains.

Example 6 is a method of deinterleaving, the method including: processing the set of TOAs using the method of Example 5 to select a first pulse train; depopulating, by the processing circuit, the set of TOAs by those TOAs represented by the first pulse train; processing the remaining TOAs to select a second pulse train; and depopulating, by the processing circuit, the remaining TOAs by those TOAs represented by the second pulse train.

Example 7 includes the method of Example 1, wherein the walking further includes: terminating the walking for the pulse train when the pulse train skips more than a given number of consecutive TOAs or a given number of total TOAs after the initial TOA from among the set of TOAs, or when the pulse train skips more than a given number of consecutive pulse indices; and when the walking is terminated, removing the pulse train from further consideration if the pulse train does not have at least a given number of TOAs from the set of TOAs, or a given proportion of the set of TOAs.

Example 8 is a system to process a set of times-of-arrival (TOAs), some of the set of TOAs representing emitted pulses by an emitter that are generated from a pulse pattern having a fixed greatest common divisor pulse repetition interval (GPRI) that identifies a type of the emitter, the system including: a create circuit to create a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type; a walk circuit to, for each pulse train of the plurality of pulse trains, process each next TOA after the one or more additional TOAs from among the set of TOAs, the walk circuit including a compute circuit to compute a next pulse index mapping the next TOA into the pulse pattern, a coherent check circuit to check if the pulse train extended by the next TOA and the next pulse index is consistent with the TOA tolerance, a viable check circuit to check if the extended pulse train is viable with the GPRI range, and an add circuit to, if both checks pass, add the next TOA and the next pulse index to the pulse train; and a select circuit to select one of the plurality of pulse trains.

Example 9 includes the system of Example 8, wherein: a given pulse train is consistent with the TOA tolerance when the TOA tolerance and the PIV define a corresponding GPRI tolerance that shrinks with the increasing pulse indices of the PIV, the initial TOA, the TOA vector, and the PIV define a corresponding estimated GPRI (EPRI) that converges to the GPRI with the increasing pulse indices of the PIV, and all values within the GPRI tolerance of the EPRI define a corresponding GPRI interval whose intersection with a previous common GPRI interval defines a next common GPRI interval that includes the EPRI; and the given pulse train is viable with the GPRI range when the GPRI interval and the GPRI range overlap at least in part.

Example 10 includes the system of Example 9, wherein the select circuit is further to one or more of: select one of the plurality of pulse trains having at least a given number of TOAs from the set of TOAs, or a given proportion of the set of TOAs; select one of the plurality of pulse trains having a largest number of TOAs from the set of TOAs; select one of the plurality of pulse trains whose EPRI is closest to the midpoint of the GPRI range; select one of the plurality of pulse trains whose EPRI multiplied by the PIV has a smallest root mean square error (RMSE) with respect to the TOA vector; and select one of the plurality of pulse trains whose GPRI interval contains a minimum RMSE point that when multiplied by the PIV has a smallest RMSE with respect to the TOA vector of any point in the GPRI interval and of the minimum RMSE point of any other pulse train.

Example 11 includes the system of Example 9, wherein for each pulse train of the plurality of pulse trains, the GPRI tolerance shrinks in proportion to the increasing pulse indices of the PIV.

Example 12 includes the system of Example 8, wherein: the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains; others of the set of TOAs represent emitted pulses by a second emitter that are generated from a second pulse pattern having a fixed second GPRI that identifies a second type of the second emitter; the create circuit is further to create a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type; the walk circuit is further to, for each pulse train of the second plurality of pulse trains, process each next TOA after the one or more additional TOAs; the compute circuit is further to compute a next pulse index mapping the next TOA into the second pulse pattern; the viable check circuit is further to check if the extended pulse train is viable with the second GPRI range; and the select circuit selects one of the plurality of pulse trains by selecting one of the first plurality of pulse trains or selecting one of the second plurality of pulse trains.

Example 13 is a system to deinterleave, the system including: a build circuit including the system of Example 12 to process the set of TOAs to select a first pulse train; and a depopulate circuit to depopulate the set of TOAs by those TOAs represented by the first pulse train; wherein the build circuit is further to process the remaining TOAs to select a second pulse train, and the depopulate circuit is further to depopulate the remaining TOAs by those TOAs represented by the second pulse train.

Example 14 includes the system of Example 8, wherein the walk circuit further includes: a terminate circuit to terminate the walk for the pulse train when the pulse train skips more than a given number of consecutive TOAs or a given number of total TOAs after the initial TOA from among the set of TOAs, or when the pulse train skips more than a given number of consecutive pulse indices; and a remove circuit to, when the walk is terminated, remove the pulse train from further consideration if the pulse train does not have at least a given number of TOAs from the set of TOAs, or a given proportion of the set of TOAs.

Example 15 is a computer program product including one or more non-transitory machine-readable storage mediums having instructions encoded thereon that when executed by one or more processors, cause a process to be carried out for a set of times-of-arrival (TOAs), some of the set of TOAs representing emitted pulses by an emitter that are generated from a pulse pattern having a fixed greatest common divisor pulse repetition interval (GPRI) that identifies a type of the emitter, the process including: creating a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type; walking, for each pulse train of the plurality of pulse trains, for each next TOA after the one or more additional TOAs from among the set of TOAs, and for each next pulse index mapping the next TOA into the pulse pattern, the walking including checking if the pulse train extended by the next TOA and the next pulse index is consistent with the TOA tolerance, checking if the extended pulse train is viable with the GPRI range, and if both checks pass, adding the next TOA and the next pulse index to the pulse train; and selecting one of the plurality of pulse trains.

Example 16 includes the computer program product of Example 15, wherein: a given pulse train is consistent with the TOA tolerance when the TOA tolerance and the PIV define a corresponding GPRI tolerance that shrinks with the increasing pulse indices of the PIV, the initial TOA, the TOA vector, and the PIV define a corresponding estimated GPRI (EPRI) that converges to the GPRI with the increasing pulse indices of the PIV, and all values within the GPRI tolerance of the EPRI define a corresponding GPRI interval whose intersection with a previous common GPRI interval defines a next common GPRI interval that includes the EPRI; and the given pulse train is viable with the GPRI range when the GPRI interval and the GPRI range overlap at least in part.

Example 17 includes the computer program product of Example 16, wherein selecting one of the plurality of pulse trains includes one or more of: selecting one of the plurality of pulse trains having at least a given number of TOAs from the set of TOAs, or a given proportion of the set of TOAs; selecting one of the plurality of pulse trains having a largest number of TOAs from the set of TOAs; selecting one of the plurality of pulse trains whose EPRI is closest to the midpoint of the GPRI range; selecting one of the plurality of pulse trains whose EPRI multiplied by the PIV has a smallest root mean square error (RMSE) with respect to the TOA vector; and selecting one of the plurality of pulse trains whose GPRI interval contains a minimum RMSE point that when multiplied by the PIV has a smallest RMSE with respect to the TOA vector of any point in the GPRI interval and of the minimum RMSE point of any other pulse train.

Example 18 includes the computer program product of Example 16, wherein for each pulse train of the plurality of pulse trains, the GPRI tolerance shrinks in proportion to the increasing pulse indices of the PIV.

Example 19 includes the computer program product of Example 15, wherein: the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains; others of the set of TOAs represent emitted pulses by a second emitter that are generated from a second pulse pattern having a fixed second GPRI that identifies a second type of the second emitter; creating the plurality of pulse trains includes creating a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type; walking further includes, for each pulse train of the second plurality of pulse trains, for each next TOA after the one or more additional TOAs from among the set of TOAs, and for each next pulse index mapping the next TOA into the second pulse pattern, checking if the pulse train extended by the next TOA and the next pulse index is consistent with the TOA tolerance, checking if the extended pulse train is viable with the second GPRI range, and if both checks pass, adding the next TOA and the next pulse index to the pulse train; and selecting one of the plurality of pulse trains includes selecting one of the first plurality of pulse trains or selecting one of the second plurality of pulse trains.

Example 20 includes the computer program product of Example 19, wherein the process is a first process, the one or more non-transitory machine-readable storage mediums have further instructions encoded thereon that when executed by the one or more processors, cause a second process to be carried out for deinterleaving, the second process including: processing the set of TOAs using the first process to select a first pulse train; depopulating the set of TOAs by those TOAs represented by the first pulse train; processing the remaining TOAs using the first process to select a second pulse train; and depopulating the remaining TOAs by those TOAs represented by the second pulse train.

Example 21 includes the computer program product of Example 15, wherein the walking further includes: terminating the walking for the pulse train when the pulse train skips more than a given number of consecutive TOAs or a given number of total TOAs after the initial TOA from among the set of TOAs, or when the pulse train skips more than a given number of consecutive pulse indices; and when the walking is terminated, removing the pulse train from further consideration if the pulse train does not have at least a given number of TOAs from the set of TOAs, or a given proportion of the set of TOAs.

Example 22 is a system including: the computer program product of Example 15; and the one or more processors to execute the encoded instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method of processing a set of times-of-arrival (TOAs), some of the set of TOAs representing emitted pulses by an emitter that are generated from a pulse pattern having a fixed greatest common divisor pulse repetition interval (GPRI) that identifies a type of the emitter, the method comprising:
   creating, by a processing circuit, a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type;
   walking, by the processing circuit, for each pulse train of the plurality of pulse trains, for each next TOA after the one or more additional TOAs from among the set of TOAs, and for each next pulse index mapping the next TOA into the pulse pattern, the walking including
      checking if the pulse train extended by the next TOA and the next pulse index is consistent with the TOA tolerance,
      checking if the extended pulse train is viable with the GPRI range, and
      if both checks pass, adding the next TOA and the next pulse index to the pulse train; and
   selecting, by the processing circuit, one of the plurality of pulse trains.

2. The method of claim 1, wherein:
   a given pulse train is consistent with the TOA tolerance when
      the TOA tolerance and the PIV define a corresponding GPRI tolerance that shrinks with the increasing pulse indices of the PIV,
      the initial TOA, the TOA vector, and the PIV define a corresponding estimated GPRI (EPRI) that converges to the GPRI with the increasing pulse indices of the PIV, and
      all values within the GPRI tolerance of the EPRI define a corresponding GPRI interval whose intersection with a previous common GPRI interval defines a next common GPRI interval that includes the EPRI; and
   the given pulse train is viable with the GPRI range when the GPRI interval and the GPRI range overlap at least in part.

3. The method of claim 2, wherein selecting one of the plurality of pulse trains comprises one or more of:
   selecting one of the plurality of pulse trains having at least a given number of TOAs from the set of TOAs, or a given proportion of the set of TOAs;
   selecting one of the plurality of pulse trains having a largest number of TOAs from the set of TOAs;

selecting one of the plurality of pulse trains whose EPRI is closest to the midpoint of the GPRI range;

selecting one of the plurality of pulse trains whose EPRI multiplied by the PIV has a smallest root mean square error (RMSE) with respect to the TOA vector; and selecting one of the plurality of pulse trains whose GPRI interval contains a minimum RMSE point that when multiplied by the PIV has a smallest RMSE with respect to the TOA vector of any point in the GPRI interval and of the minimum RMSE point of any other of the plurality of pulse trains.

4. The method of claim 1, wherein:

the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains;

others of the set of TOAs represent emitted pulses by a second emitter that are generated from a second pulse pattern having a fixed second GPRI that identifies a second type of the second emitter;

creating the plurality of pulse trains comprises creating a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type;

walking further includes, for each pulse train of the second plurality of pulse trains, for each next TOA after the one or more additional TOAs from among the set of TOAs, and for each next pulse index mapping the next TOA into the second pulse pattern, checking if the pulse train extended by the next TOA and the next pulse index is consistent with the TOA tolerance, checking if the extended pulse train is viable with the second GPRI range, and if both checks pass, adding the next TOA and the next pulse index to the pulse train; and selecting one of the plurality of pulse trains comprises selecting one of the first plurality of pulse trains or selecting one of the second plurality of pulse trains.

5. A method of deinterleaving, the method comprising:

processing the set of TOAs using the method of claim 4 to select a first pulse train;

depopulating, by the processing circuit, the set of TOAs by those TOAs represented by the first pulse train;

processing the remaining TOAs to select a second pulse train; and depopulating, by the processing circuit, the remaining TOAs by those TOAs represented by the second pulse train.

6. The method of claim 1, wherein the walking further includes:

terminating the walking for the pulse train when the pulse train skips more than a given number of consecutive TOAs or a given number of total TOAs after the initial TOA from among the set of TOAs, or when the pulse train skips more than a given number of consecutive pulse indices; and when the walking is terminated, removing the pulse train from further consideration if the pulse train does not have at least a given number of TOAs from the set of TOAs, or a given proportion of the set of TOAs.

7. A system to process a set of times-of-arrival (TOAs), some of the set of TOAs representing emitted pulses by an emitter that are generated from a pulse pattern having a fixed greatest common divisor pulse repetition interval (GPRI) that identifies a type of the emitter, the system comprising:

a create circuit to create a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type;

a walk circuit to, for each pulse train of the plurality of pulse trains, process each next TOA after the one or more additional TOAs from among the set of TOAs, the walk circuit including a compute circuit to compute a next pulse index mapping the next TOA into the pulse pattern, a coherent check circuit to check if the pulse train extended by the next TOA and the next pulse index is consistent with the TOA tolerance, a viable check circuit to check if the extended pulse train is viable with the GPRI range, and an add circuit to, if both checks pass, add the next TOA and the next pulse index to the pulse train; and a select circuit to select one of the plurality of pulse trains.

8. The system of claim 7, wherein:

a given pulse train is consistent with the TOA tolerance when the TOA tolerance and the PIV define a corresponding GPRI tolerance that shrinks with the increasing pulse indices of the PIV, the initial TOA, the TOA vector, and the PIV define a corresponding estimated GPRI (EPRI) that converges to the GPRI with the increasing pulse indices of the PIV, and all values within the GPRI tolerance of the EPRI define a corresponding GPRI interval whose intersection with a previous common GPRI interval defines a next common GPRI interval that includes the EPRI; and the given pulse train is viable with the GPRI range when the GPRI interval and the GPRI range overlap at least in part.

9. The system of claim 8, wherein the select circuit is further to one or more of:

select one of the plurality of pulse trains having at least a given number of TOAs from the set of TOAs, or a given proportion of the set of TOAs;

select one of the plurality of pulse trains having a largest number of TOAs from the set of TOAs;

select one of the plurality of pulse trains whose EPRI is closest to the midpoint of the GPRI range;

select one of the plurality of pulse trains whose EPRI multiplied by the PIV has a smallest root mean square error (RMSE) with respect to the TOA vector; and select one of the plurality of pulse trains whose GPRI interval contains a minimum RMSE point that when multiplied by the PIV has a smallest RMSE with respect to the TOA vector of any point in the GPRI interval and of the minimum RMSE point of any other pulse train.

10. The system of claim 7, wherein:

the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains;

others of the set of TOAs represent emitted pulses by a second emitter that are generated from a second pulse pattern having a fixed second GPRI that identifies a second type of the second emitter;

the create circuit is further to create a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type;

the walk circuit is further to, for each pulse train of the second plurality of pulse trains, process each next TOA after the one or more additional TOAs;

the compute circuit is further to compute a next pulse index mapping the next TOA into the second pulse pattern;

the viable check circuit is further to check if the extended pulse train is viable with the second GPRI range; and the select circuit selects one of the plurality of pulse trains by selecting one of the first plurality of pulse trains or selecting one of the second plurality of pulse trains.

11. A system to deinterleave, the system comprising:
a build circuit including the system of claim 10 to process the set of TOAs to select a first pulse train; and
a depopulate circuit to depopulate the set of TOAs by those TOAs represented by the first pulse train;
wherein the build circuit is further to process the remaining TOAs to select a second pulse train, and the depopulate circuit is further to depopulate the remaining TOAs by those TOAs represented by the second pulse train.

12. The system of claim 7, wherein the walk circuit further includes:
a terminate circuit to terminate the walk for the pulse train when the pulse train skips more than a given number of consecutive TOAs or a given number of total TOAs after the initial TOA from among the set of TOAs, or when the pulse train skips more than a given number of consecutive pulse indices; and
a remove circuit to, when the walk is terminated, remove the pulse train from further consideration if the pulse train does not have at least a given number of TOAs from the set of TOAs, or a given proportion of the set of TOAs.

13. A computer program product including one or more non-transitory machine-readable storage mediums having instructions encoded thereon that when executed by one or more processors, cause a process to be carried out for a set of times-of-arrival (TOAs), some of the set of TOAs representing emitted pulses by an emitter that are generated from a pulse pattern having a fixed greatest common divisor pulse repetition interval (GPRI) that identifies a type of the emitter, the process comprising:
creating a plurality of pulse trains each including an initial TOA and a TOA vector of one or more additional TOAs from among the set of TOAs, and a corresponding pulse index vector (PIV) mapping the TOA vector into the pulse pattern consistent with a known TOA tolerance and viable with a known GPRI range of the emitter type;
walking, for each pulse train of the plurality of pulse trains, for each next TOA after the one or more additional TOAs from among the set of TOAs, and for each next pulse index mapping the next TOA into the pulse pattern, the walking including checking if the pulse train extended by the next TOA and the next pulse index is consistent with the TOA tolerance,
checking if the extended pulse train is viable with the GPRI range, and
if both checks pass, adding the next TOA and the next pulse index to the pulse train; and
selecting one of the plurality of pulse trains.

14. The computer program product of claim 13, wherein:
a given pulse train is consistent with the TOA tolerance when
the TOA tolerance and the PIV define a corresponding GPRI tolerance that shrinks with the increasing pulse indices of the PIV,
the initial TOA, the TOA vector, and the PIV define a corresponding estimated GPRI (EPRI) that converges to the GPRI with the increasing pulse indices of the PIV, and
all values within the GPRI tolerance of the EPRI define a corresponding GPRI interval whose intersection with a previous common GPRI interval defines a next common GPRI interval that includes the EPRI; and
the given pulse train is viable with the GPRI range when the GPRI interval and the GPRI range overlap at least in part.

15. The computer program product of claim 14, wherein selecting one of the plurality of pulse trains comprises one or more of:
selecting one of the plurality of pulse trains having at least a given number of TOAs from the set of TOAs, or a given proportion of the set of TOAs;
selecting one of the plurality of pulse trains having a largest number of TOAs from the set of TOAs;
selecting one of the plurality of pulse trains whose EPRI is closest to the midpoint of the GPRI range;
selecting one of the plurality of pulse trains whose EPRI multiplied by the PIV has a smallest root mean square error (RMSE) with respect to the TOA vector; and
selecting one of the plurality of pulse trains whose GPRI interval contains a minimum RMSE point that when multiplied by the PIV has a smallest RMSE with respect to the TOA vector of any point in the GPRI interval and of the minimum RMSE point of any other pulse train.

16. The computer program product of claim 14, wherein for each pulse train of the plurality of pulse trains, the GPRI tolerance shrinks in proportion to the increasing pulse indices of the PIV.

17. The computer program product of claim 13, wherein:
the emitter is a first emitter, the pulse pattern is a first pulse pattern, the GPRI is a first GPRI, the type of the emitter is a first type, the GPRI range is a first GPRI range, and the plurality of pulse trains is a first plurality of pulse trains;
others of the set of TOAs represent emitted pulses by a second emitter that are generated from a second pulse pattern having a fixed second GPRI that identifies a second type of the second emitter;
creating the plurality of pulse trains comprises creating a second plurality of pulse trains each including an initial TOA and a TOA vector of one or more additional TOAs from among the set of TOAs, and a corresponding PIV mapping the TOA vector into the second pulse pattern consistent with the TOA tolerance and viable with a known second GPRI range of the second type;

walking further includes, for each pulse train of the second plurality of pulse trains, for each next TOA after the one or more additional TOAs from among the set of TOAs, and for each next pulse index mapping the next TOA into the second pulse pattern,
  checking if the pulse train extended by the next TOA and the next pulse index is consistent with the TOA tolerance,
  checking if the extended pulse train is viable with the second GPRI range, and
  if both checks pass, adding the next TOA and the next pulse index to the pulse train; and
selecting one of the plurality of pulse trains comprises selecting one of the first plurality of pulse trains or selecting one of the second plurality of pulse trains.

18. The computer program product of claim 17, wherein the process is a first process, the one or more non-transitory machine-readable storage mediums have further instructions encoded thereon that when executed by the one or more processors, cause a second process to be carried out for deinterleaving, the second process comprising:
  processing the set of TOAs using the first process to select a first pulse train;
  depopulating the set of TOAs by those TOAs represented by the first pulse train;
  processing the remaining TOAs using the first process to select a second pulse train; and
  depopulating the remaining TOAs by those TOAs represented by the second pulse train.

19. The computer program product of claim 13, wherein the walking further includes:
  terminating the walking for the pulse train when the pulse train skips more than a given number of consecutive TOAs or a given number of total TOAs after the initial TOA from among the set of TOAs, or when the pulse train skips more than a given number of consecutive pulse indices; and
  when the walking is terminated, removing the pulse train from further consideration if the pulse train does not have at least a given number of TOAs from the set of TOAs, or a given proportion of the set of TOAs.

20. A system comprising:
  the computer program product of claim 13; and
  the one or more processors to execute the encoded instructions.

* * * * *